US009294337B2

(12) United States Patent
Bollapalli et al.

(10) Patent No.: US 9,294,337 B2
(45) Date of Patent: Mar. 22, 2016

(54) METHODS AND SYSTEMS FOR INTEGRATING INDEPENDENT IMS AND WEBRTC NETWORKS

(71) Applicant: Sonus Networks, Inc., Westford, MA (US)

(72) Inventors: Nagesh Kumar Bollapalli, Bangalore (IN); Justin Hart, Purton (GB)

(73) Assignee: SONUS NETWORKS, INC., Westford, MA (US)

( * ) Notice: Subject to any disclaimer, the term of this patent is extended or adjusted under 35 U.S.C. 154(b) by 158 days.

(21) Appl. No.: 14/292,034

(22) Filed: May 30, 2014

(65) Prior Publication Data

US 2015/0280963 A1    Oct. 1, 2015

(30) Foreign Application Priority Data

Mar. 26, 2014 (IN) .......................... 1616/CHE/2014

(51) Int. Cl.
*G06F 15/16* (2006.01)
*H04L 12/24* (2006.01)
*H04L 29/08* (2006.01)

(52) U.S. Cl.
CPC .......... *H04L 41/0206* (2013.01); *H04L 67/141* (2013.01)

(58) Field of Classification Search
CPC ......................... H04L 41/0206; H04L 67/141
See application file for complete search history.

(56) References Cited

U.S. PATENT DOCUMENTS

| 2014/0325078 A1* | 10/2014 | Shan | H04W 36/0066 709/227 |
| 2014/0379931 A1* | 12/2014 | Gaviria | H04L 67/141 709/227 |
| 2015/0180825 A1* | 6/2015 | Ren | H04L 61/2564 709/228 |

* cited by examiner

*Primary Examiner* — Jonathan Bui
(74) *Attorney, Agent, or Firm* — Stephen T. Straub; Ronald P. Straub; Michael P. Straub

(57) ABSTRACT

Independent IMS and WebRTC communications networks are integrated via an applications server including IMS and WebRTC functionality. A user equipment device including IMS and WebRTC capability is registered via the same application server with both the IMS and WebRTC networks. The application server is configured to make a routing determination whether to route a communications session over an IMS communications path or an RTC communications path when it is determined that parallel independent paths are available.

18 Claims, 22 Drawing Sheets

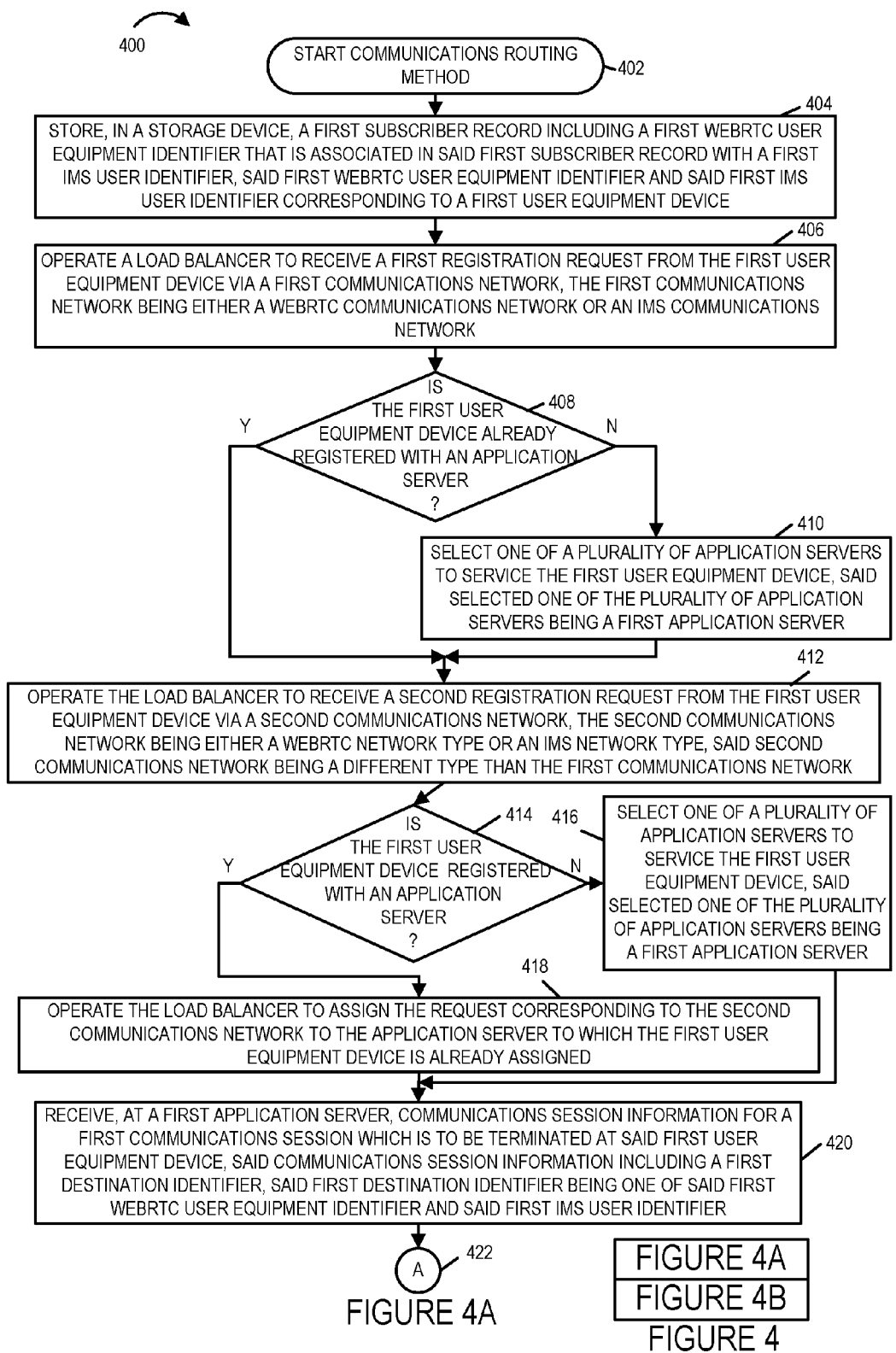

METHODS AND SYSTEMS FOR INTEGRATING INDEPENDENT IMS AND WEBRTC NETWORKS

FIELD OF INVENTION

Various embodiments relate to communications networks, and more particularly, to the integrations of IMS and WebRTC networks.

BACKGROUND

IMS was originally defined by the wireless standards body 3GPP (3rd Generation Partnership Project). IMS networks are utilized for delivering, among other things, IP multimedia services.

WebRTC is an emerging initiative to support full communications (including voice and video) natively from a web browser without the need for any additional plugins or a native Application on the client.

Currently, IMS and WebRTC networks are frequently deployed as parallel independent networks. It would be advantageous to have a way to integrate the services and connection paths provided by these parallel independent networks so that users who have access to both the IMS and WebRTC networks can be offered alternative, e.g., low cost, connection paths through the networks.

SUMMARY

In various embodiments, IMS and WebRTC networks are deployed, e.g., as parallel independent networks, and integrated to offer an alternative, e.g. low cost, connection path, e.g. a WebRTC path, to an IMS user.

In some embodiments in which WebRTC and IMS networks are deployed, e.g., as independent networks, a user establishes both WebRTC and IMS connections towards the operator. When a user makes calls to other regular IMS-users and PSTN-users, the same identity (e.g., the user's MSISDN allocated by the operator) can be used by performing WebRTC to SIP interworking. When a user makes calls to other WebRTC users, the same identity or WebRTC specific identity can be used and in this case, WebRTC to SIP Interworking is not performed.

In various embodiments, a novel application server (AS), supporting SIP and WebRTC signaling, is used to couple an IMS network to a WebRTC network. In some such embodiments, a system deployment includes a plurality of applications servers, supporting SIP and WebRTC signaling, and a load balancer used to allocate an application server to a user equipment device. When multiple application servers are deployed in the architecture, the same application server is selected, by the load balancer, for IMS registration and Web-Services login, corresponding to a particular user equipment device so that the application server can take intelligent routing decisions regarding that UE device, e.g., deciding whether the communications path should be over the IMS network or over the WebRTC network.

An exemplary communications routing method, in accordance with some embodiments, includes: storing in a storage device, a first subscriber record, said first subscriber record including a first WebRTC user equipment identifier that is associated in said first subscriber record with a first IMS user identifier, said first WebRTC user equipment identifier and said first IMS user identifier corresponding to a first user equipment device; receiving at a first application server communications session information for a first communications session which is to be terminated at said first user equipment device, said communications session information including a first destination identifier, said first destination identifier being one of said first WebRTC user equipment identifier and said first IMS user identifier; determining, based upon the received first destination identifier, whether said first user equipment device is currently registered with the application server and if registered, determining which of a plurality of parallel independent networks are available for supporting the communications session with the first user equipment device; and making a routing determination whether to route the communications session over an IMS communications path in an IMS network or over a WebRTC communications path in a WebRTC network, when it is determined that parallel independent IMS and WebRTC communications networks are available for routing said communications session.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 4A is a first part of a flowchart of an exemplary communications routing method in accordance with an exemplary embodiment.

DETAILED DESCRIPTION

Figure 1:
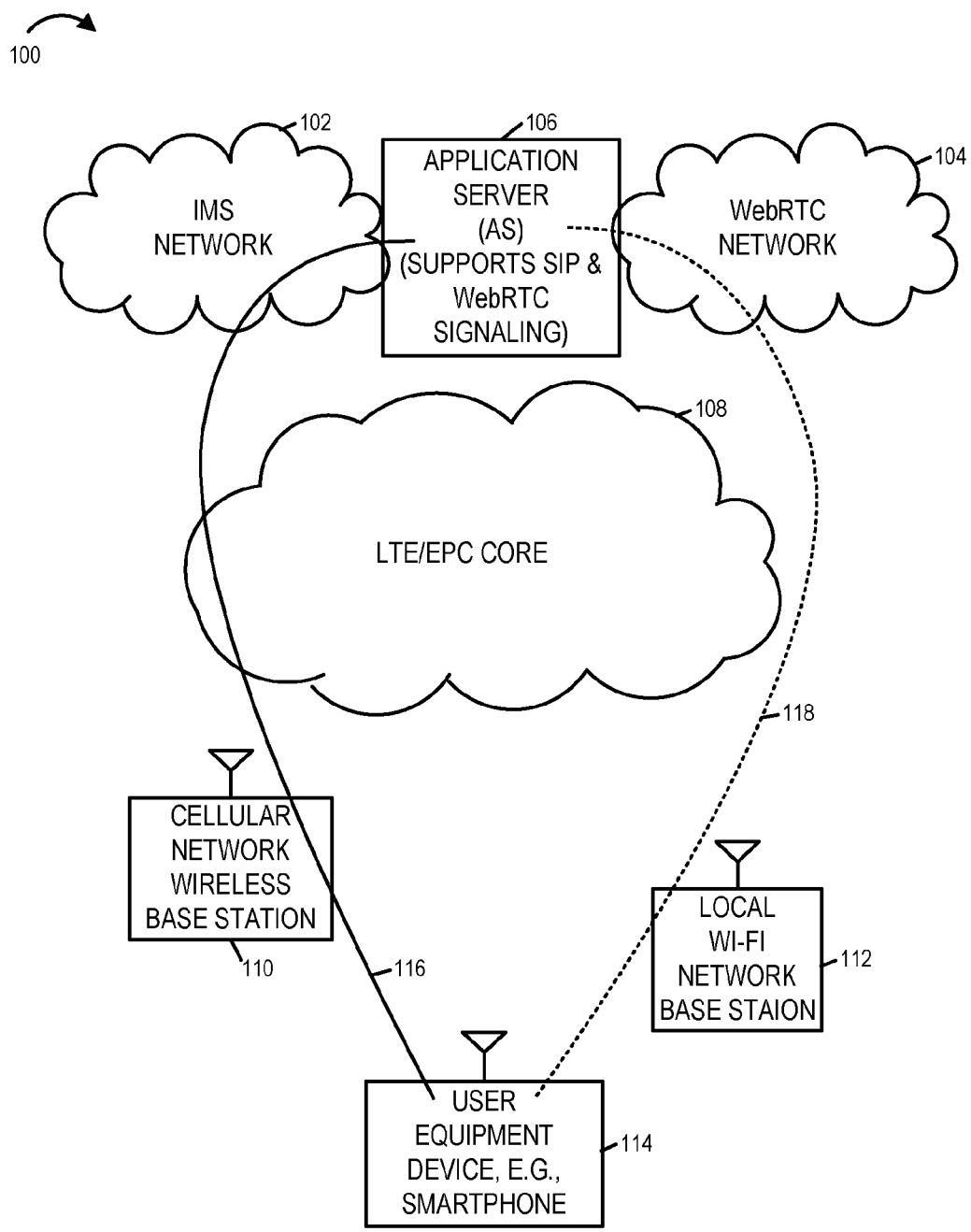
FIG. 1 illustrates an exemplary system in which separate WebRTC and IMS networks are integrated in a non-roaming scenario.

FIG. 1 illustrates an exemplary system 100 in which separate WebRTC & IMS networks (104, 102) are integrated in a non-roaming scenario. The WebRTC network 104 and the IMS network 102 run in parallel and an Application Server (AS) 106 is placed to bridge between these two networks (104, 102).

The Application Server 106 acts as a bridge between the two different networks, the IMS network 102 and the WebRTC network 104, and the application server (AS) 106 supports both SIP and WebRTC signaling. When exemplary user equipment (UE) device 114, e.g., a smart phone, registers to IMS network 102, the AS 106 is notified using the 3$^{rd}$ party registration mechanisms defined by the IMS standards. This is depicted by the solid line path 116, which includes signaling through exemplary cellular network base station 110 and LTE/EPC core network 108.

Similarly, when the UE device 114 logs into the Webservices Server, i.e. registers to WebRTC network 104, the AS 106 is in the path since WebService server and AS 106 are physically the same device 106 in this exemplary architecture. This is depicted by the dashed line path 118, which includes signaling through local Wi-Fi network base station 112. In some embodiments, the signaling path 118 includes communications via an Ethernet or other wired access network instead of via local Wi-Fi base station 112. In some embodiments, UE device 114 is a laptop personal computer with a SIM card onboard.

Figure 2:
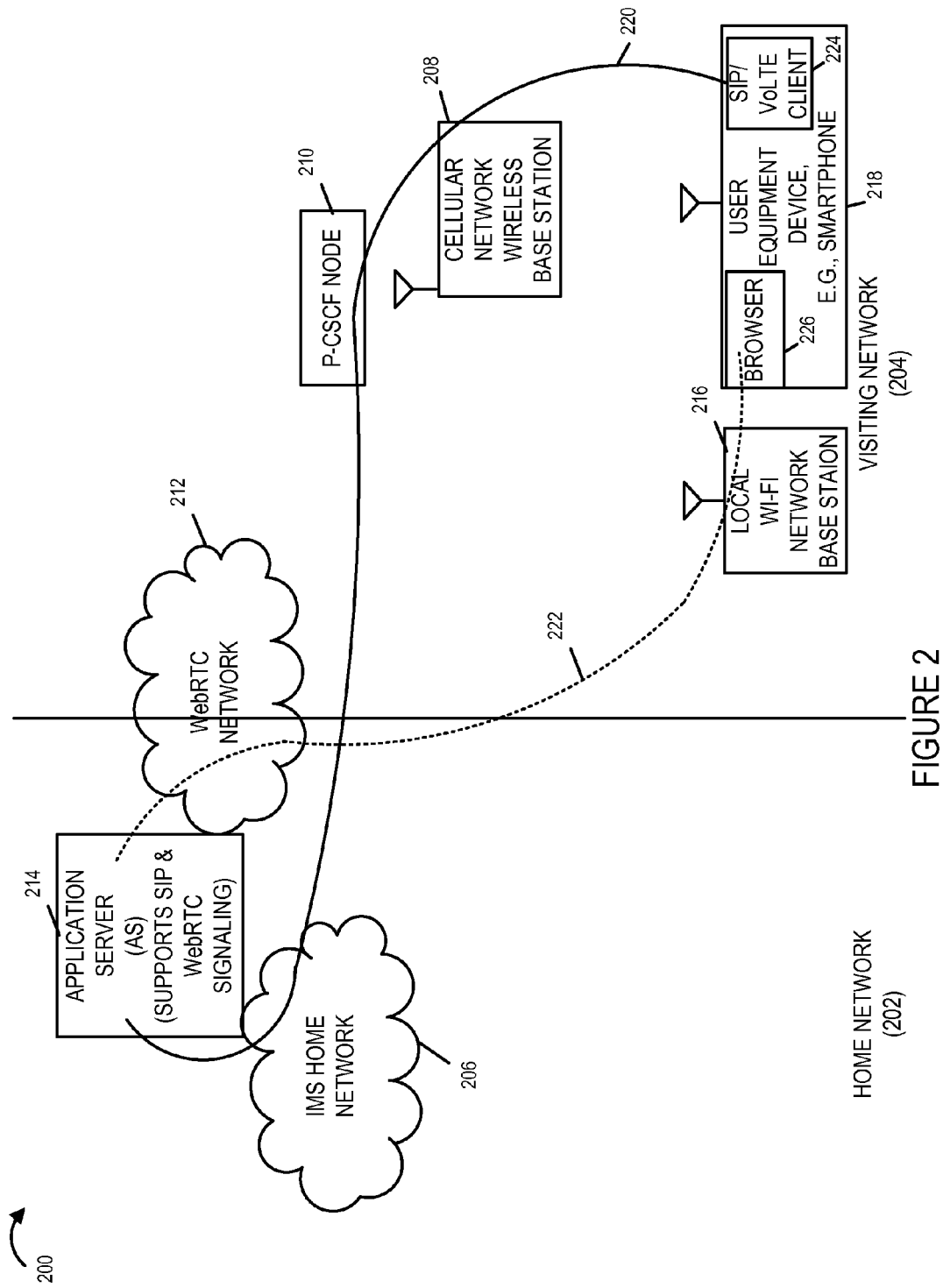
FIG. 2 illustrates an exemplary system in which separate WebRTC and IMS networks are integrated in a roaming scenario.

FIG. 2 illustrates an exemplary system 200 in which separate WebRTC & IMS networks (212, 206) are integrated in a roaming scenario. The WebRTC network 212 and the IMS network 206 run in parallel and an Application Server (AS) 214 is placed to bridge between these two networks (212, 206). Exemplary UE device 218, e.g., a smart phone has a home network 202 including IMS home network 206.

The Application Server 214 acts as a bridge between the two different networks, IMS home network 206 and WebRTC network 212, and the application server (AS) 214 supports both SIP and WebRTC signaling. When the user equipment (UE) device 218, e.g., a smart phone, registers itself to the IMS network 206, information on visiting network 204, i.e. whether the UE 218 is roaming or not, the UE 218 capabilities, e.g., whether the UE supports audio, video, IM, presence etc., etc. is passed to the AS 214 over the standard SIP ISC interface.

FIG. 2 shows a typical IMS/VoLTE roaming case. Exemplary user equipment (UE) device 218, e.g., a smart phone, has roamed to a partner network, which is visiting network 204. The typical behavior for the SIP/VoLTE client 224 is shown in the solid line path 220. UE device 218 connects to the local P-CSCF 210 in the visited network 204 via cellular network base wireless base station 208. Local P-CSCF 210 determines that user equipment device 218 is roaming, and therefore the call control signaling including the SIP registration is routed back to the home network 206. The home network 206 provides the services for the UE device 218 and hence associates UE device 218 with an application server, which in this example, is application server 214.

The user equipment device 218 is also connected to a local Wi-Fi network, via local Wi-Fi network base station 216, and the user of UE device 218 decides to use the WebRTC service provided by their home carrier. The UE device 218 launches its browser 226 and connects to the URL of the service. This path via local Wi-Fi network base station 216, represented by dotted line 222, is outside of the roaming network infrastructure, instead utilizing free or low cost Wi-Fi from the office, hotel, café or other location. This path 222 connects back directly to the servers in the home network 202 including application server 214 which is a WebService server. The user equipment device 218 can alternatively connect to a WebServer using the regular LTE connection in the visiting network 204.

Both connections (220, 222) can either share the same identity or different identities. In the latter case, the mapping between the identities can be, and in some embodiments, is done at the AS 214. In some embodiments, the mapping between the identities performed by the applications server 214 includes making use of an external database.

When an incoming call is received from another IMS user or PSTN user, the regular IMS procedures would result in the AS 214 getting looped in. The application server 214 chooses either the IMS signaling path or WebRTC signaling path based on local policy. In some embodiments, local policy is based on one or more or all of: the location of the user, user preferences, date and/or time of day.

In some embodiments, the local policy includes choosing the signaling path based on the location of the user, which is, e.g., derived from the signaling information at the time of SIP registration and/or from the WebRTC signaling path signaling. In some embodiments, the location of the user is derived from one of SIP signaling or WebRTC signaling. In some embodiments, the location of the user is derived from a combination of the SIP signaling information and from the WebRTC path signaling information. In some embodiments, the location of the user is derived from the SIP signaling including, e.g., information identifying a specific end point, information identifying a P-CSCF, with a known location or information identifying another network node with a known location. In some embodiments, the WebRTC signaling may include additional information and/or hints that are used to derive device location, e.g., GPS coordinates from the device, GPS coordinates of a Wi-Fi base station, Wi-Fi base station ID identifying a Wi-Fi base station which is associated with stored GPS coordinates, etc., which are not readily available or normally sent in the SIP signaling. Exemplary signaling information used to derive the location of the user includes, e.g., Visited-Network-ID, and/or Access-network-Info. In some embodiments, using the location of the user to select the signaling path, facilitates the call to be delivered on a low-cost connection if the access-connection being used by the UE device 218 is WiFi and the user is roaming.

In some embodiments, the local policy includes choosing the signaling path based on user preferences. For example, in some embodiments, a user may prefer that IMS/PSTN calls are to be delivered only via incoming IMS signaling path. As another example, in some embodiments, a user may prefer to use the incoming WebRTC signaling path only if the call is received from WebRTC path.

In some embodiments, the local policy includes choosing the signaling path based on the date and/or time-of-day information. For example, during a time of day during which the charges for using the IMS signaling path are low or free, e.g., in accordance with a user's subscription plan, the IMS signaling path is used; otherwise, the WebRTC signaling path is used.

When an incoming call is received over WebRTC connection, the same logic as described above can be, and in some embodiments, is applied. Also if the WebRTC is used, e.g., for gaming applications, there is no need to perform interworking (from WebRTC to SIP). In other words, in some embodiments, the above described logic (and thus interworking to SIP) is done for WebRTC services providing voice/video communications and not for other WebRTC services.

Similarly, in some embodiments, for outgoing calls, the choice of whether to use a SIP or WebRTC connection is made by the user device.

A key point to note in this architecture is that for registrations via the two different connections, the same application server 214 is used so that AS 214 can apply intelligent routing logic for incoming calls, as described above.

In some embodiments, as the networks grow additional application servers are deployed. In various embodiments, a system may, and sometimes does, include a plurality of alternative possible application servers, and a UE device is associated with a particular application server at the time of the UE device's registration. In various embodiments, corresponding to a particular UE device, the same application server instance is selected for IMS registration and WebServices login, so that the selected application server can make intelligent routing decisions with regard to the UE device. In some embodiments, a load-balancer which supports both SIP and WebRTC interfaces, is used to associate a user equipment device with a particular application server, e.g., the load balancer selects and assigns the UE device to the same particular application server for both a SIP path and WebRTC path. In some other embodiments, instead of using a load balancer, a distributed hash table or similar structure is used which allows a new registration on an arbitrary node to be paired with a registration already existing on some other node and for the information of each to be made available to the other. In such an embodiment, the two registrations don't have to follow the same path to the same AS; however, any AS making a decision needs to know about the existence of both registrations.

Figure 3:
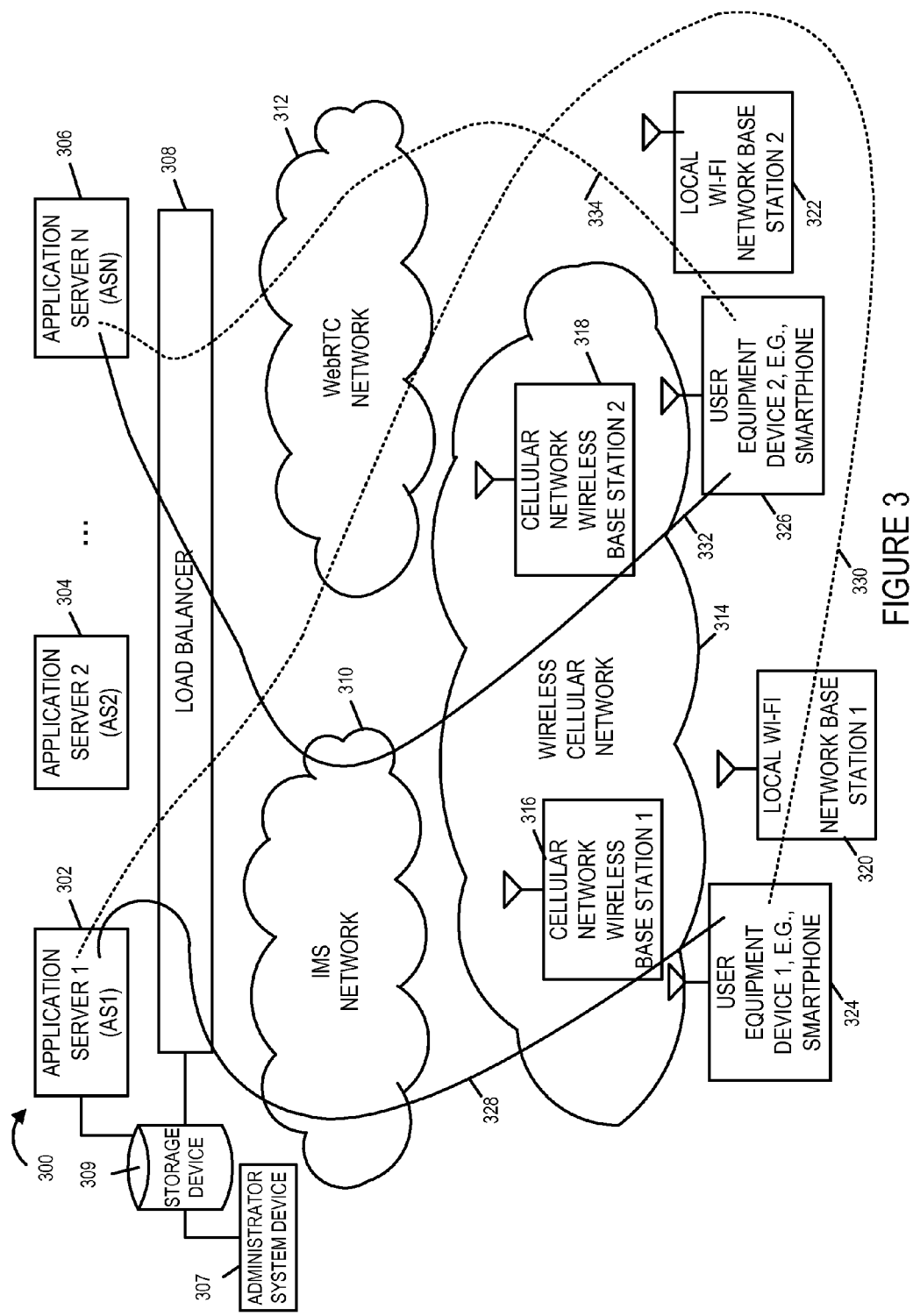
FIG. 3 illustrates an exemplary system including a plurality of applications servers, a load balancer, a storage device, a WebRTC network, and an IMS network in accordance with an exemplary embodiment.

FIG. 3 illustrates an exemplary system 300 including an administrator system 307, a plurality of applications servers (AS 1 302, AS 2 304, ..., AS N 306), a load balancer 308, a storage device 309, a WebRTC network 312, an IMS network 310, a wireless cellular network 314, Wi-Fi base stations including WiFi BS 1 320 and Wi-Fi BS 2 322, and a plurality of user equipment devices including user equipment device 1 324, e.g., a smart phone, and user equipment device 2 326, e.g., a smart phone. Subscriber records, corresponding to user equipment devices, are stored in storage device 309.

In some embodiments, subscriber records corresponding to UE devices, e.g., a first subscriber record corresponding to UE device 1 324 and a second subscriber record corresponding to UE device 2 326, are stored by administrator system device 307 in storage device 309. An exemplary first subscriber record includes a first WebRTC user equipment identifier that is associated in said first subscriber record with a first IMS user identifier, said first WebRTC user equipment identifier and said first IMS user identifier corresponding to a first user equipment device. In various embodiments, the subscriber records may be, and sometimes are, are accessed and/or updated by load balancer 308 and/or by application servers (302, 304, ..., 306). An updated subscriber record may include information associating the user equipment device with a particular application server to which it has been assigned by the load balancer 308.

When a UE device registers via a first connection, e.g., an IMS connection, the load-balancer 308 selects an application server instance from among the plurality of alternative application servers (application server 1 302, applications server 2 304, ..., application server N 306) and stores the associations (UE Identity-AS Instance Address) in a storage device 309, e.g., in an external database like LDAP server or HSS, etc. When the registration is received, for the same UE device, via the second connection, e.g., WebRTC in this example, the load-balancer 308 selects the same AS-instance using the stored-association so that registration-state from both the connections is available. This would enable the selected AS to apply intelligent routing logic for incoming calls towards the UE.

If the UE identity in IMS and WebRTC networks (310, 312) is different, the database would also map the identities from one identity and another identity so that association data (Identity to AS instance) can still be fetched at the time of UE registration.

In various embodiments, the IMS and WebRTC networks (310, 312) are deployed as parallel independent networks and are still integrated to offer an alternative connection path to an IMS user. The architecture also optimizes the need for WebRTC to SIP interworking depending on who is being called (WebRTC or SIP).

In various embodiments, the association between the UE Identity and AS instance is stored at the time of UE registration in an architecture where the WebRTC and IMS networks are managed as two separate clouds. The association is created at the time of first registration via one of the connections and is re-used for the second registration via the other connection.

In FIG. 3, consider that exemplary UE 1 device 324 has registered first with the IMS network 310, and has been assigned to AS 1 302 for an IMS connection by load balancer 308. Subsequently UE device 1 324 registers with the Web RTC network 312 and is assigned by load balancer 308 to the same AS, AS 1 302, for an WebRTC connection. Thus there is an established IMS connection path 328 represented by solid line 328, which includes cellular network wireless base station 1 316, IMS network 310 and AS 1 302, and an established WebRTC connection path 330 represented by dotted line 330, which includes local Wi-Fi network base station 1 320, Web RTC network 312 and application server 1 302.

Further consider that exemplary UE 2 device 326 has registered first with the WebRTC network 312, and has been assigned to AS N 306 for a WebRTC connection by load balancer 308. Subsequently UE device 2 326 registers with the IMS network 310 and is assigned by load balancer 308 to the same AS, AS N 306, for an IMS connection. Thus there is an established IMS connection path, represented by solid line 332, which includes cellular network wireless base station 2 318, IMS network 310 and AS N 306, and an established WebRTC connection path, represented by dotted line 334, which includes local Wi-Fi network base station 2 322, Web RTC network 312 and application server N 306.

Figure 4B:
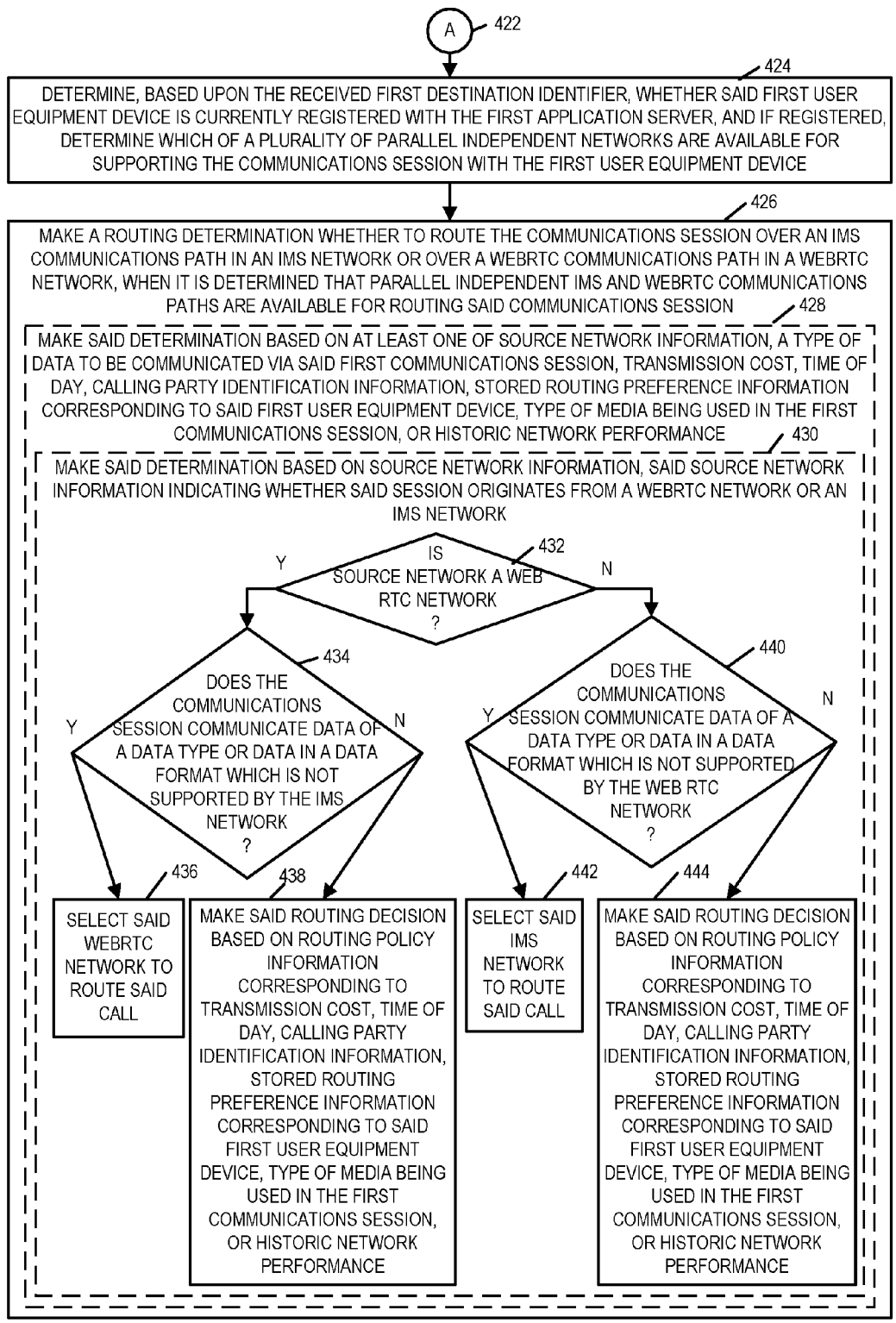
FIG. 4B is a second part of a flowchart of an exemplary communications routing method in accordance with an exemplary embodiment.

FIG. 4, comprising the combination of FIG. 4A and FIG. 4B, is a flowchart 400 of an exemplary communications routing method in accordance with an exemplary embodiment. Operation of the exemplary method starts in step 402 and proceeds to step 404.

In step 404, a first subscriber record is stored in a storage device, the first subscriber record including a first WebRTC user equipment identifier that is associated in said first subscriber record with a first IMS user identifier, said first WebRTC user equipment identifier and said first IMS user identifier corresponding to a first user equipment device. The first use equipment device is, e.g., a smart phone with IMS and WebRTC capability corresponding to a first user. Operation proceeds from step 404 to step 406.

In step 406 a load balancer is operated to receive a first registration request from the first user equipment device via a first communications network, the first communications network being either a WebRTC communications network or an IMS communications network. Operation proceeds from step 406 to step 408.

In step 408 a determination is made as to whether or not the first user equipment device is already registered with an application server. If it is determined that the first user equipment device is not already registered with an application server, then operation proceeds from step 408 to step 410; otherwise, operation proceeds from step 408 to step 412. In step 410, one of a plurality of application servers is selected to service the first user equipment device, said selected one of the plurality of application servers being a first application server. Thus, in step 410 the user equipment device is assigned to a selected application server and the association is stored in the storage device. Operation proceeds from step 410 to step 412.

In step 412 the load balancer is operated to receive a second registration request from the first user equipment device via a second communications network, the second communications network being either a WebRTC network type or an IMS network type, said second communications network being a different type than the first communications network. Operation proceeds from step 412 to step 414.

In step 414, a determination is made as to whether or not the first user equipment device is registered with an application server. If it is determined that the first user equipment device is already registered with an application server, then operation proceeds from step 414 to step 418; otherwise, operation proceeds from step 414 to step 416. In step 416, one of a plurality of application servers is selected to service the first user equipment device, said selected one of the plurality of application servers being a first application server. Operation proceeds from step 416 to step 420.

Returning to step 418, in step 418 the load balancer is operated to assign the request corresponding to the second communications network to the application server to which the first user equipment device is already assigned. Operation proceeds from step 418 to step 420.

In step 420 a first application server receives communications session information for a first communications session which is to be terminated at said first user equipment device, said communications session information including a first destination identifier, said first destination identifier being one of said first WebRTC user equipment identifier and said first IMS user identifier. Operation proceeds from step 420 via connecting node A 422 to step 424.

In step 424 it is determined, based upon the received first destination identifier, whether said first user equipment device is currently registered with the first application server, and if registered, it is determined which of a plurality of parallel independent networks are available for supporting the communications session with the first user equipment device. For example, it is determined which of the networks with which the first application server interacts, are networks in which the first user device is currently registered, and of those which ones can handle the communications session given the type of session. Operation proceeds from step 424 to step 426.

In step 426 a routing determination is made as to whether to route the communications session over an IMS communications path in an IMS network, e.g., LTE, or over a WebRTC communications path in a WebRTC network, when it is determined that parallel independent IMS and WebRTC communications paths are available for routing said communications session. In some embodiments, step 426 includes step 428, in which said determination is made based on at least one of source network information, a type of data to be communicated via said first communications session, transmission cost, time of day, calling party identification information, stored routing preference information corresponding to said first user equipment device, type of media being used in the first communications session, or historic network performance, e.g., based on session statistics corresponding to one or more sessions.

In some embodiments, making a routing determination includes making said determination based on said type of media being used in the first communications session, said type of media being used in the first communications session being communicated in the communication session setup. In some such embodiments, the type of media could be, e.g., voice/video or IM/presence. In some such embodiments, when the type of media is voice or video, the method further comprises selecting IMS network to route said call based on policy; and when the type of media is IM/Presence, the method further comprises selecting WebRTC network to route said call based on policy.

In some embodiments, step 428 includes step 430. In step 430, said determination is made based on source network information, said source network information indicating whether said session originates from a WebRTC network or an IMS network. Step 430 includes steps 432, 434, 436, 438, 440, 442 and 444. If the source network is a Web RTC network then, operation proceeds from step 432 to step 434; however, if the source network is an IMS network, then operation proceeds from step 432 to step 440.

Returning to step 434, in step 434 it is determined whether or not the communications session communicates data of a data type or data in a data format which is not supported by the IMS network, e.g., a gaming application. If it is determined that the communications session communicates data of a data type or data in a data format which is not supported by the IMS network, then operation proceeds from step 434 to step 436, in which said WebRTC network is selected to route said call. However, when it is determined that the communications session does not communicate data of a data type or data in a data format which is not supported by the IMS network, then operation proceeds from step 434 to step 438, in which said routing decision is made based on routing policy information corresponding to transmission cost, time of day, calling party identification information, stored routing preference information corresponding to the first user equipment device, type of media being used in the first communications session, or historic network performance, e.g., based on session statistics corresponding to one or more sessions.

Returning to step 440, in step 440 it is determined whether or not the communications session communications data of a data type or data in a data format which is not supported by the WebRTC network. If it is determined that the communications session communicates data of a data type or data in a data format which is not supported by the WebRTC network and/or is for a service which could be provided by WebRTC but is not supported by the WebRTC network, e.g., because the network has not implemented support for the service, then operation proceeds from step 440 to step 442, in which said IMS network is selected to route said call. However, when it is determined that the communications session does not communicates data of a data type or data in a data format which is not supported by the WebRTC network, then operation proceeds from step 440 to step 444, in which said routing decision is made based on routing policy information corresponding to transmission cost, time of day, calling party identification information, stored routing preference information corresponding to the first user equipment device, type of media being used in the first communications session, or historic network performance, e.g., based on session statistics corresponding to one or more sessions.

In one exemplary embodiment, step 404 is performed by a administrator system, e.g., administrator system 307; steps 406, 408, 410, 412, 414, 416, and 418 are performed by a load balancer, e.g., load balancer 308, and steps 420, 424, 426, 428, 430, 432, 434, 436, 438, 440, 442, 444, are performed by a selected application server, e.g., application server 1 302; and the first user equipment device is UE 1 324.

In some embodiments, a routing determination, e.g., of step 428, 438, or 444, is based on registration state (SIP/WebRTC), signaling information in SIP registration (like Visited-Network-ID, Access-network-Info etc) and other static user preferences (time-of-day) etc.

In some embodiments, a routing determination, e.g., of step 428, 438, or 448, is based on a policy that presence or IM traffic is to be delivered over a WebRTC communications path while voice/video sessions are to be delivered over a IMS communications path.

In some embodiments, a routing determination, e.g., of step 428, 438, or 448, is based on a policy that delivers the call over the same type of communications path on which incoming session is received so that (media) transcoding is not needed.

In some embodiments, a routing determination, e.g., of steps 428, 438 or 448, is based on a policy that delivers all calls over a WebRTC communications path if the user is currently accessing WebRTC services via WiFi/Broadband and thus saves cost. This would be useful when the user is at home using his/her broadband connection or is roaming accessing WebRTC using a WiFi connection at a hotel, café, etc.

Various additional aspects and/or features are further discussed below. As WebRTC technology gains more traction and user acceptance, the need to provide access to IMS services from WebRTC browsers becomes imminent. This enables WebRTC deployments to focus more on next-generation features while getting access to traditional IMS features like voice, conferencing, etc. and thus providing combinational services.

A mechanism for integrating WebRTC clients with IMS networks and, more specifically, a means for providing IMS services to WebRTC clients is described below.

A WebRTC deployment provides a specialized application, and the specialized application may benefit by having access to IMS services. For e.g., a gaming web-site could have an application in which a sub-set of participants (belonging to private room) would like to join a conference to discuss gaming strategies. In such a case, the WebRTC application may invoke conferencing services provided by an IMS operator. There are multiple mechanisms and architectures that are possible to provide IMS services to WebRTC browser clients. One such architecture is where a WebRTC webserver is deployed as an application server (AS) in an IMS deployment.

This architecture is sometimes referred to herein as a "WebRTC IMS AS Architecture." Before delving into the details of WebRTC IMS AS architecture, it is worth discussing some of the various use-cases for WebRTC and IMS integration and also how the WebRTC IMS AS architecture fits into some of these various use-cases. Some of the typical use-cases/deployment options for providing IMS services to WebRTC clients are described below.

Figure 5:
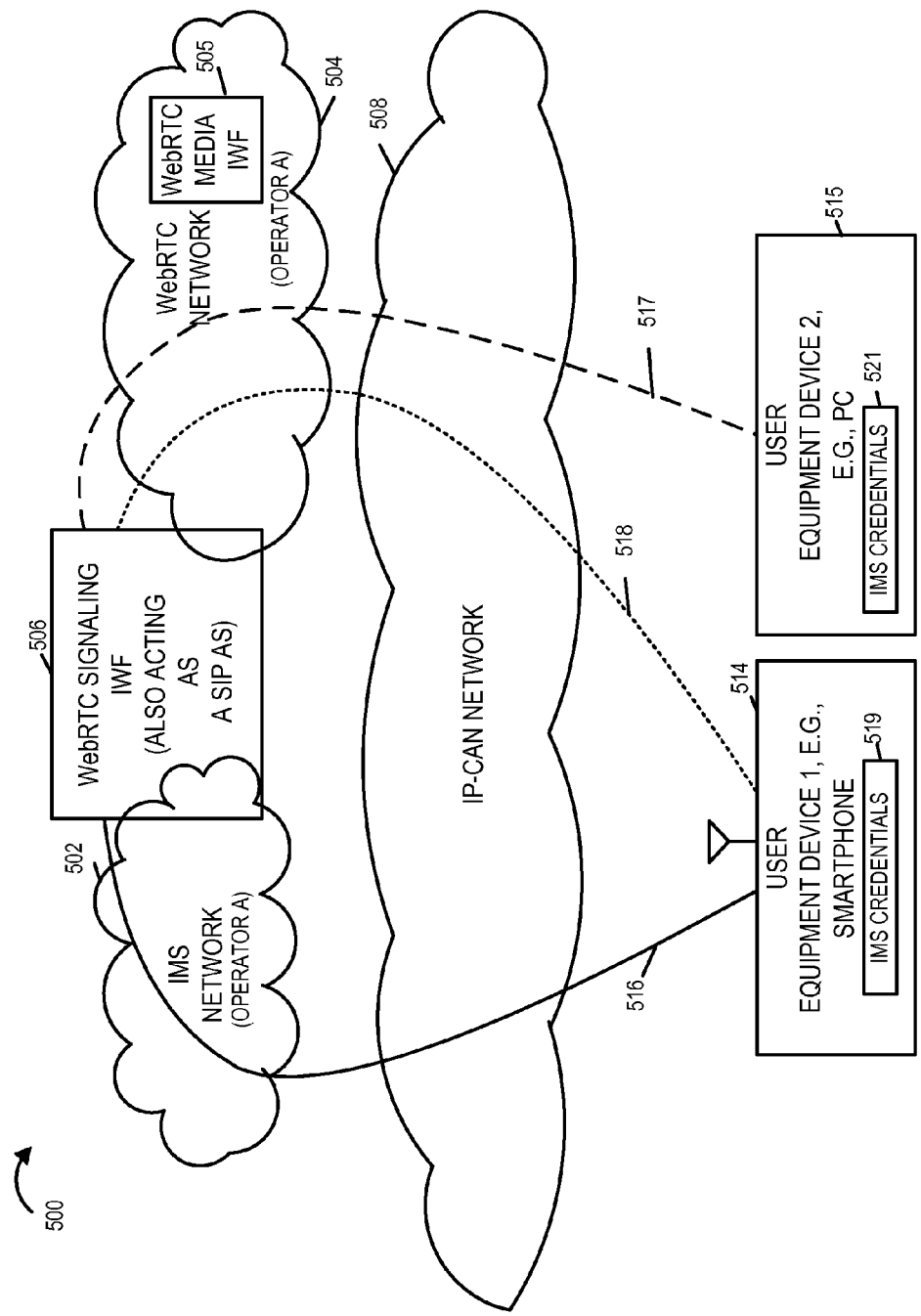
FIG. 5 is a drawing used to illustrate an IMS operator providing IMS and WebRTC services.

FIG. 5 is a drawing 500 used to illustrate an IMS operator providing IMS and WebRTC services. Drawing 500 illustrates an exemplary IMS network 502 corresponding to Operator A, an exemplary WebRTC network 504 corresponding to Operator A, an IP Connectivity Access (IP CAN) network 508, a first user equipment device 514, e.g., a smart phone, and a second user equipment device 515, e.g., a PC. WebRTC signaling Interworking Function (IWF) node 506, which also acts as a SIP AS, bridges the IMS network 502 and the WebRTC network 504. The WebRTC network 504 includes a WebRTC Media Interworking Function (IWF) node 505. In some other embodiments, the IWF 505 bridges media between the two networks (502, 504), as one media leg is WebRTC centric and the other is IMS centric.

In one exemplary deployment, an IMS operator hosts WebRTC portal and provides access to IMS services to its customer's WebRTC clients via the WebRTC portal using IMS credentials and viewing WebRTC as yet-another access-type. In this use-case, the IMS credentials are used to gain access to IMS and WebRTC services.

The user may access IMS and WebRTC services using the same device, e.g., user equipment device 1 514, e.g., a mobile such as a smart phone, or two different devices, e.g., user equipment device 1 514, e.g., a mobile, and user equipment device 2 515, e.g., a personal computer, using IMS credentials (519, 521) in either case. The reason why the operator chooses to install and allow separate connections to WebRTC and IMS is for the simple reason that WebRTC and IMS provide different services. When the user has access to IMS service using WebRTC client, the IP access could be via either LTE or Wi-Fi/BB. When the user has access to IMS services using IMS client, the IP access is via LTE.

Solid line 516 illustrates a control signaling path including LTE signaling in which user equipment device 1 514 communicates with WebRTC signaling IWF 506. Dotted line 518 illustrates a control signaling path including WiFi/BB signaling in which user equipment device 1 514 communicates with WebRTC signaling IWF 506. Dashed line 517 illustrates a control signaling path including WiFi/BB signaling in which user equipment device 2 515 communicates with WebRTC signaling IWF 506.

Figure 6:
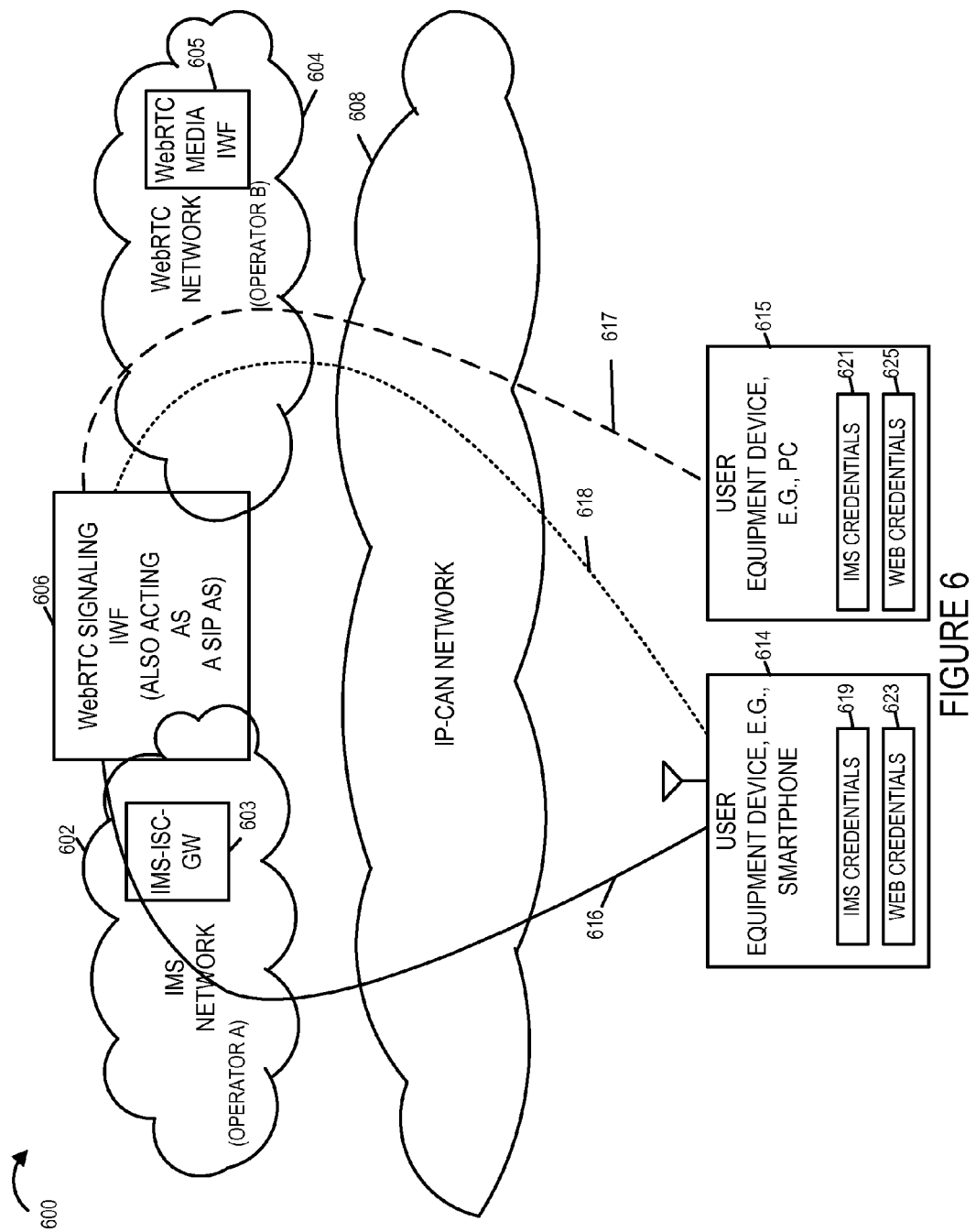
FIG. 6 is a drawing used to illustrate an IMS operator providing IMS services, a Web Operator providing Web-RTC services, and the Web Operator and the IMS Operator having a business agreement.
Figure 7:
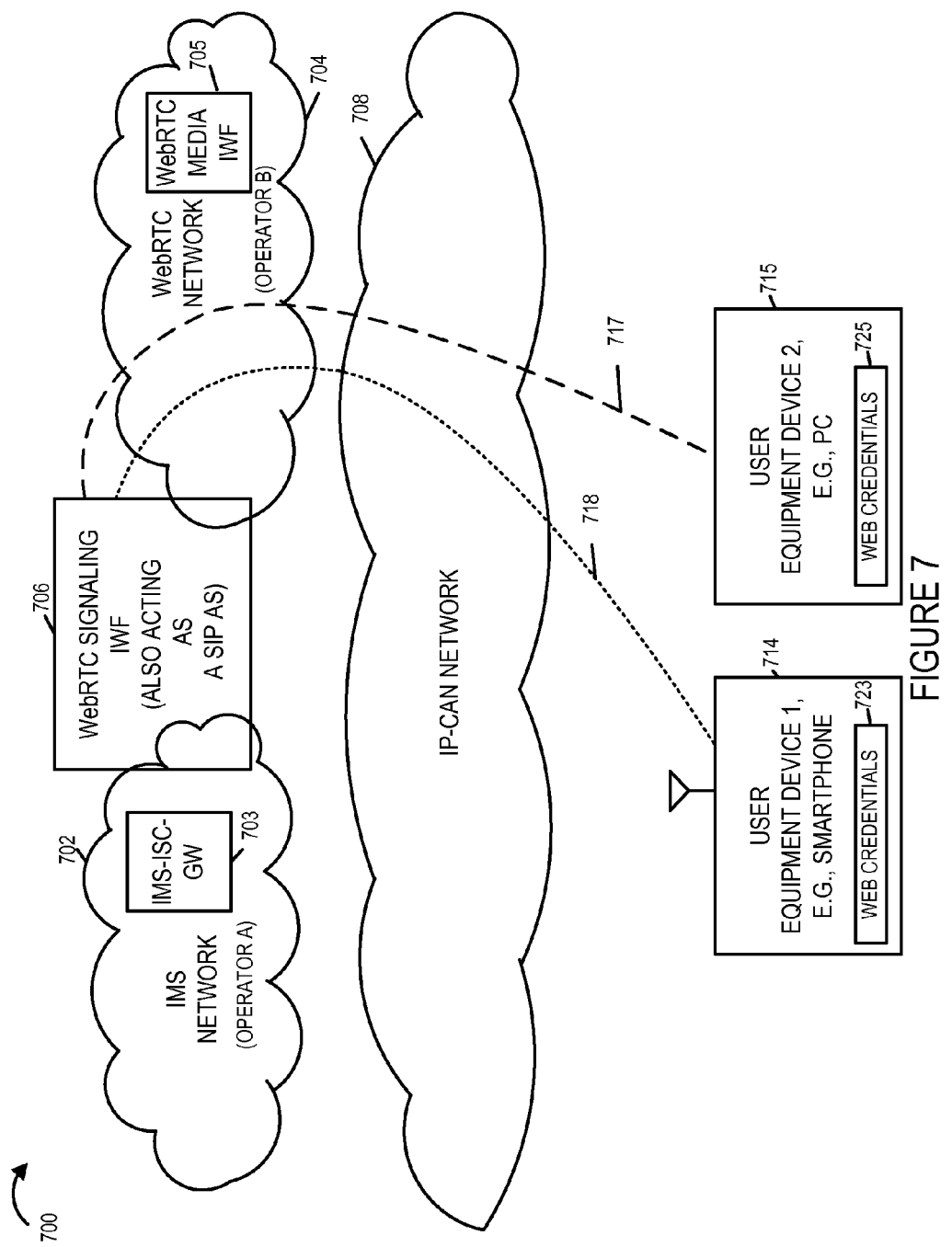
FIG. 7 is a drawing used to illustrate an IMS operator providing IMS services, a Web Operator providing Web-RTC services, and the Web Operator and the IMS Operator having a business agreement.

FIG. 6 and FIG. 7 are drawings used to illustrate an IMS operator providing IMS services, a Web Operator providing WebRTC services, and the Web Operator and the IMS Operator having a business agreement.

In some embodiments, there is a deployment in which an IMS operator and $3^{rd}$ party Web-operator have a business agreement. The user accesses WebRTC services using the 3$^{rd}$ party Web-portal, which provides specialized applications. There are two sub-cases.

In the first sub-case, the user has both IMS and WebRTC subscription with the respective operators. The user authenticates itself to Web operator. The Web-operator may fetch IMS identities from IMS operator and authenticate itself to the IMS on behalf of the user. This may be useful in a scenario where user accesses (specialized) web-services and still gets IMS services.

The user may access IMS and WebRTC services using the same device (mobile) or two different devices (e.g., mobile, PC)—using IMS, Web credentials in either case. From user's perspective, he/she accesses IMS voice services using IMS credentials and value-added WebRTC services using web credentials.

Drawing 600 illustrates an exemplary IMS network 602 corresponding to Operator A, an exemplary WebRTC network 604 corresponding to Operator B, an IP Connectivity Access (IP CAN) network 608, a first user equipment device 614, e.g., a smart phone including IMS credentials 619 and Web credentials 623, and a second user equipment device 615, e.g., a PC, including IMS credentials 621 and Web credentials 625. WebRTC signaling Interworking Function (IWF) node 606, which also acts as a SIP AS, bridges the IMS network 602 and the WebRTC network 604. The Web RTC network 604 includes a WebRTC Media Interworking Function (IWF) node 605. The IMS network 602 includes a IMS-ISC-GW 603.

In a second sub-case, the user has subscription with WebRTC operator, but does not have a subscription with the IMS operator. The user doesn't have IMS subscription and the Web credentials are used for WebRTC access. The WebRTC operator through the business agreement allocates a temporary IMS ID to the user from a pool of IMS ID's allocated to the Web-operator (through business agreement with the IMS operator).

Drawing 700 illustrates an exemplary IMS network 702 corresponding to Operator A, an exemplary WebRTC network 704 corresponding to Operator B, an IP Connectivity Access (IP CAN) network 708, a first user equipment device 714, e.g., a smart phone, including Web credentials 723 and a second user equipment device 715, e.g., a PC, including Web credentials 725. WebRTC signaling Interworking Function (IWF) node 706, which also acts as a SIP AS, bridges the IMS network 702 and the WebRTC network 704. The Web RTC network 704 includes a WebRTC Media Interworking Function (IWF) node 705. The IMS network 702 also includes a IMS-ISC-GW 703.

In an additional use-case/deployment an IMS Operator and WebRTC Operator access 3$^{rd}$ party AS services. A 3$^{rd}$ party operator provides SIP services as a service to both IMS and WebRTC operators. These are independently managed clouds sharing the same set of AS' instances.

Figure 8:
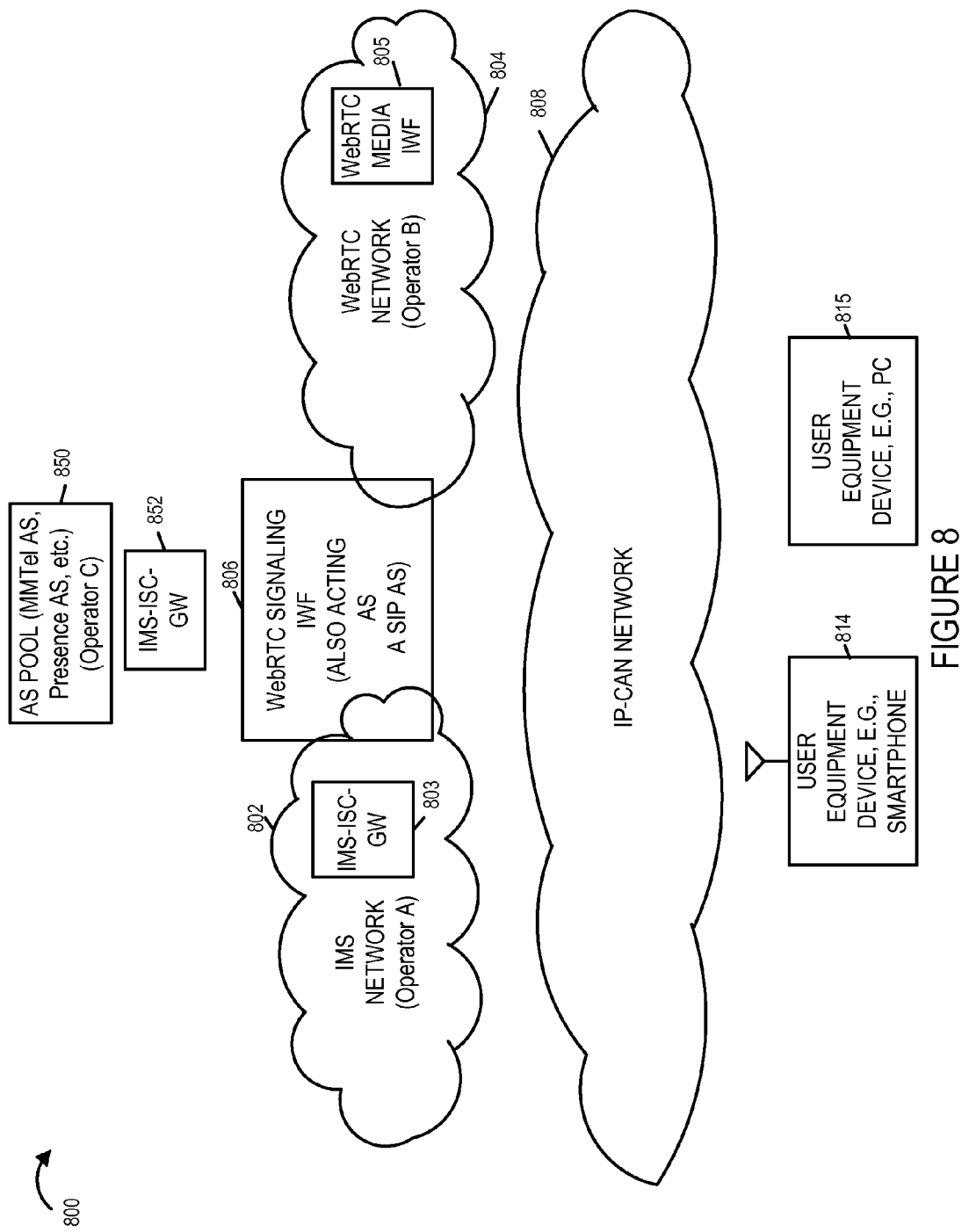
FIG. 8 illustrates an exemplary IMS network corresponding to Operator A, an exemplary WebRTC network corresponding to Operator B, an IP Connectivity Access (IP CAN) network, a first user equipment device, e.g., a smart phone, and a second user equipment device, e.g., a PC, in accordance with an exemplary embodiment.

FIG. 8 includes drawing 800 which illustrates an exemplary IMS network 802 corresponding to Operator A, an exemplary WebRTC network 804 corresponding to Operator B, an IP Connectivity Access (IP CAN) network 808, a first user equipment device 814, e.g., a smart phone, and a second user equipment device 815, e.g., a PC. WebRTC signaling Interworking Function (IWF) node 806, which also acts as a SIP AS, bridges the IMS network 802 and the WebRTC network 804. The Web RTC network 804 includes a WebRTC Media Interworking Function (IWF) node 805. The IMS network 802 includes a IMS-ISC-GW 803. The exemplary system of FIG. 8 further includes an application server (AS) pool 850 corresponding to an Operator C, and an IMS-ISC-GW 852. AS pool 850 includes, e.g., MultiMedia Telephony Application Server (MMTel AS), Presence AS, etc.

Figure 9:
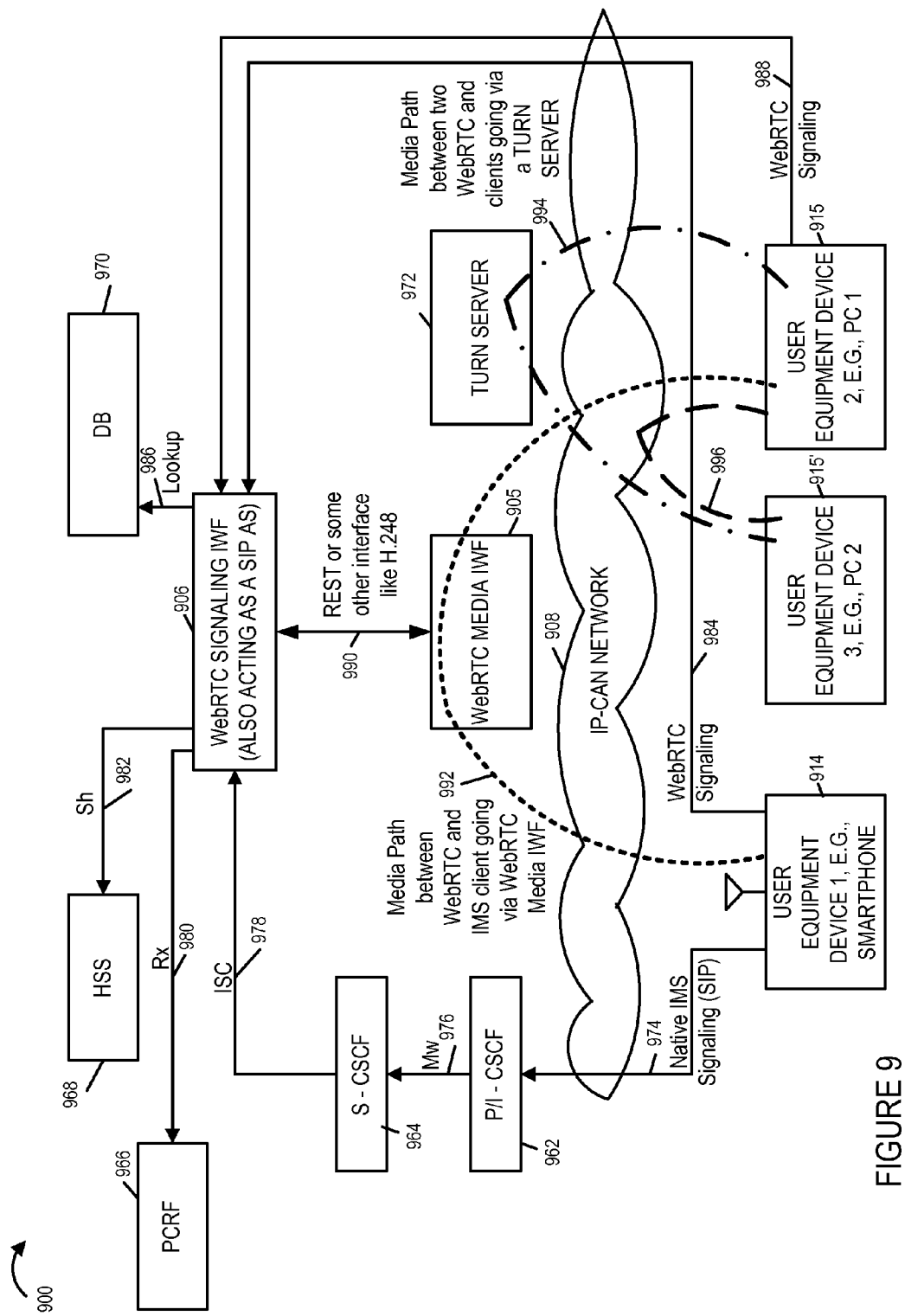
FIG. 9 illustrates an exemplary architecture in accordance with some embodiments.

FIG. 9 illustrates an exemplary architecture in accordance with some embodiments. Exemplary system 900 of FIG. 9 includes a plurality of user equipment devices (user equipment device 1 914, e.g., a smart phone, user equipment device 2 915, e.g., PC 1, user equipment device 3 915', e.g., PC 2), a WebRTC signaling IWF 906, which also acts as a SIP AS, a WebRTC Media IWF 905, an IP-CAN network 908, a Proxy Call Session Control Function (P/I-CSCF) 962, a Serving Call Session Control Function (S-CSCF) 964, a PCRF 966, a Home Subscriber Server (HSS) 968, a Database (DB) 970, and a Traversal Using Relays around NAT (TURN) server 972.

WebRTC Signaling IWF node 906 performs the conversion of WebRTC to SIP signaling.

WebRTC Signaling IWF node 906 acts as a Web Server for WebRTC clients and performs the following functions: (i) authentication of WebRTC clients, (ii) acts as a registrar for WebRTC clients, (iii) invokes Media IWF 905 on a need basis, (iv) anchors calls from/toward WebRTC connection. With regard to Authentication of WebRTC clients, depending on the deployment, as described above with regard to FIGS. 5-8, the credentials used could be from IMS or Web operator. Exemplary call-flows are detailed in later sections. With regard to acting as a registrar for WebRTC clients, node 906 stores the registration state (and thus acts as a registrar) and can potentially route calls between WebRTC clients without needing to perform WebRTC to SIP conversion.

With regard to invoking Media IWF on-a-need basis, node 906 invokes Media IWF 905 as needed for e.g., if the call is established between a WebRTC client and a native IMS client. Node 906 would have the necessary intelligence to bypass a media IWF 905 for direct peer-to-peer calls between two WebRTC clients. With regard to anchoring of calls from/towards WebRTC connection, the anchoring facilitates handover between both the connections. The WebRTC connection may be from a WiFi connection which is different than the native LTE/IMS connection.

The WebRTC signaling IWF 906 also acts as a SIP AS from IMS/LTE core perspective. If a client has both IMS and WebRTC subscriptions, the IMS registration state is learnt using 3$^{rd}$ party registration procedures. As a SIP AS, node 906 is in the path for all incoming and outgoing calls, thus anchoring calls from/towards a UE. For incoming calls towards the user, node 906 as a SIP AS may, and in some embodiments does, apply additional logic to select either the WebRTC connection or IMS connection. For a UE device which doesn't have IMS subscription or in a deployment where the IMS operator services are leased by Web Operator, node 906 as a SIP AS would not learn registration state of the UE and instead invokes IMS services as an AS (on behalf of the user). This refers to use-case described with respect to FIG. 7 above.

In some embodiments, WebRTC signaling IWF node 906 includes the Ability to invoke existing IMS AS's on a need basis. In some deployments, node 906 invokes services provided by other SIP AS's in the deployment. For example, node 906 may invoke the services of a Presence AS to store/fetch presence status of WebRTC clients as well as fetch presence status of regular IMS clients (if a WebRTC client has both the numbers in the address book).

WebRTC signaling IWF node 906 includes the ability to interface with PCRF node 966 via Rx interface 980. The IWF node 906 interfaces with PCRF 966 over Rx interface, if the WebRTC connection is established over LTE. If the WebRTC connection is established over WiFi, the Rx interface 980 is not invoked.

WebRTC Media IWF node 905 is included in the path where transcoding is needed between WebRTC Codecs (e.g. OPUS/VP8) and IMS/LTE codecs (e.g. AMR/H.264). This supports WebRTC specific media handling like ICE, DTLS-SRTP etc. This would also interwork WebRTC data channels to MSRP, BFCP etc. based on the context of the application.

P/I-CSCF node 962 and S-CSCF node 964 are IMS core elements in an IMS network.

User equipment device 1 914 sends native IMS signaling, e.g., SIP signaling, to P/I-CSCF node 962. P/I-CSCF node 962 sends Mw signal 976 to S-CSCF node 964. S-CSCF node 964 sends ISC signal 978 to WebRTC signaling IWF 906.

User equipment device 1 914 sends WebRTC signaling 984 to WebRTC signaling IWF 906. User equipment device 2 915 sends WebRTC signaling 988 to WebRTC signaling IWF 906.

WebSignaling IWF 906 sends exemplary lookup signal 986 to database 970. WebRTC Signaling IWF node 906 sends Sh signal 982 to HSS node 968.

Interface 990 between WebRTC signaling IWF and Web Media IWF 905 is a Representational State Transfer (REST) interface or some other interface such as, e.g., an H.248 interface.

Dotted line 992 represents an exemplary media path between a WebRTC client of user equipment device 2 915 and an IMS client of user equipment device 1 914 via WebRTC media IWF 905. Dash/dot line 994 represents a media path between two WebRTC clients, the Web RTC client of user equipment device 2 915 and the WebRTC client of user equipment device 3 915'. The media path represented by dash/dot line 994 is via TURN server 972.

Dashed line 996 represents a media path between two WebRTC clients, the Web RTC client of user equipment device 2 915 and the WebRTC client of user equipment device 3 915'. The media path represented by dashed line 996 does not traverse TURN server 972.

Exemplary call flows will be described corresponding to the previously described architecture. The following call-flows depict the registration call-flow for a WebRTC user. The call-flows are shown separately for each of the deployment scenarios.

An exemplary call flow corresponding to an IMS Operator providing IMS and WebRTC services will be described with respect to drawing 1000 of FIG. 10, e.g., corresponding to the deployment described in FIG. 5. User 1002 accesses Web portal, as indicated by arrow 1010. In response, WebRTC signaling IWF 1006 challenges 1012 the user 1002. User 1002 sends log-in signals 1014 to WebRTC signaling IWF 1006. WebRTC signaling IWF 1006 fetches the credentials corresponding to the user, via signaling 1015, with HSS/DB 1008. WebRTC signaling IWF 1006 sends Javascript (JS) 1016 to user 1002. A Web socket connection is established between user 1002 and WebRTC signaling IWF 1006, via signaling 1018. The user 1002 sends a Register signal to WebRTC signaling IWF 1006, and receives a 200 OK, as indicated signaling 1020.

User 1002 sends a Register signal 1022 to IMS core 1004 on the IMS connection. The IMS core 1004 responds with challenge 1024. User 1002 sends Register signal 1026 with credentials to IMS core 1004. The IMS core 1030 responds with 200 OK signal 1028.

The IMS core 1004 sends Register signal 1030 to WebRTC signaling IWF 1006. WebRTC signaling IWF 1006 sends 200 OK signal 1032 to IMS core 1004.

The user 1002 connects using both WebRTC and IMS connections separately—either using the same client or using two different devices (mobile and PC). The IMS credentials are used in either case.

In the case where the user logs in using two different devices—it could be that both devices are using LTE connection or one of the device using LTE and the other using WiFi/Broadband connection.

As described above, the WebRTC IWF 1006 acts as a SIP AS (in the IMS network). When the user 1002 logs/registers using the IMS connection, the IWF 1006 is notified using the existing 3$^{rd}$ party registration procedures. When the user logs in using only the WebRTC connection, the IWF 1006 is in the path (after all) since it acts as a Web-Server. As per as the IMS network is concerned, the user is not IMS-registered. The IWF can still invoke IMS services by configuring "unregistered" service invocation in the iFC and can initiate calls etc as a SIP AS on behalf of the user.

The IMS and WebRTC identities can be same or different. If they are different, the IWF 1006 maps between these identities by accessing a common DB 1008 like HSS.

An exemplary call flow corresponding to an IMS Operator providing IMS, a Web-operator providing WebRTC services and Web-operator and IMS Operator having a business agreement with the user having both IMS and WebRTC Subscriptions will now be described, e.g., corresponding to the deployment described in FIG. 6.

Figure 10:
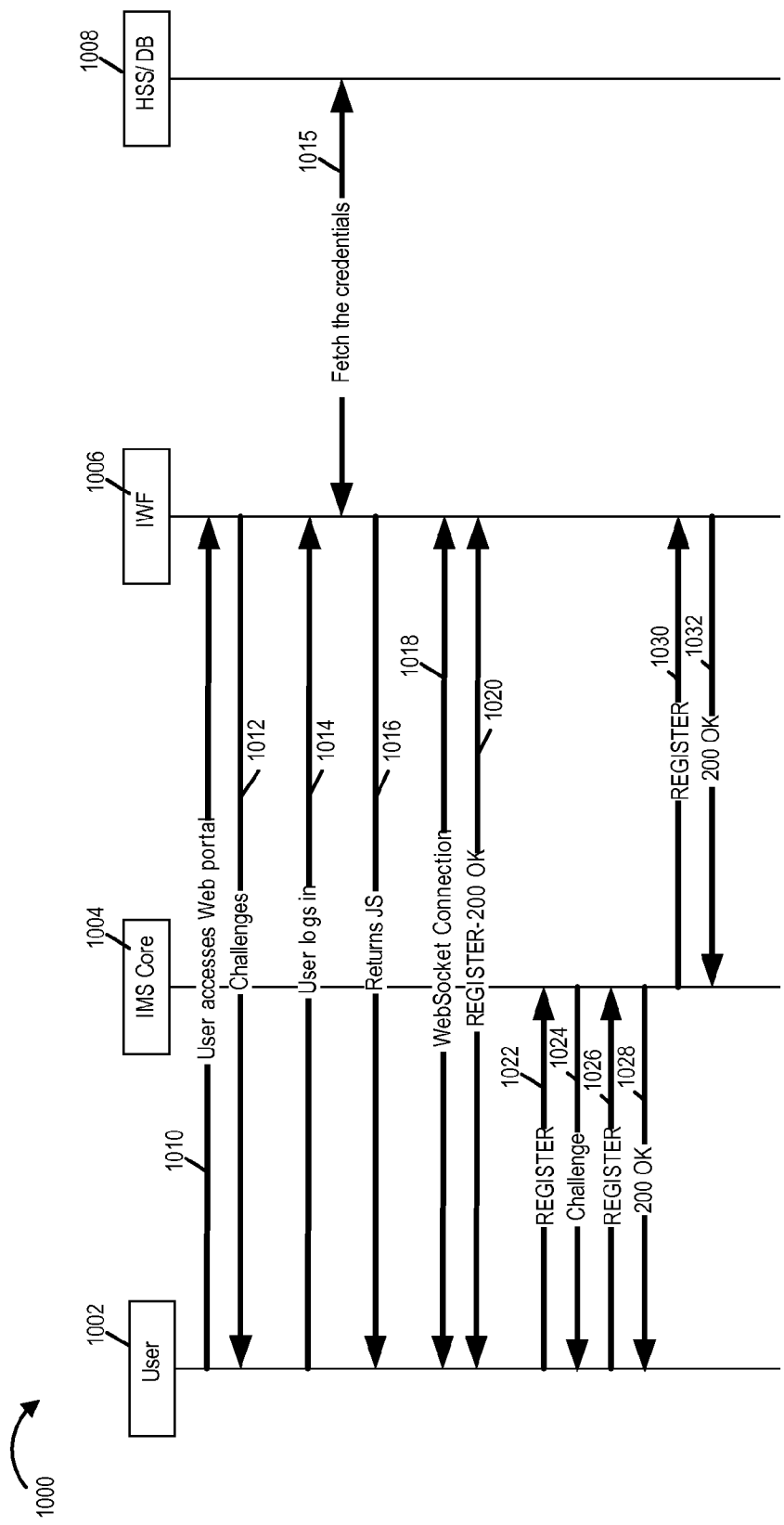
FIG. 10 illustrates an exemplary call flow corresponding to an IMS Operator providing IMS and WebRTC services.

The exemplary call-flow is similar to that in FIG. 10. The procedure description is also the similar. The following points shall be noted. The user may choose to register using only one connection (e.g., IMS) or both connections (IMS, WebRTC). The user may choose different subscriptions to register depending on the device-type. For example, the user registers to IMS network while using mobile and registers to WebRTC network while using PC/Laptop/iPad. The IMS and WebRTC identities are typically different. The IWF maps between these identities by accessing a common DB like HSS.

An exemplary call flow corresponding to an IMS Operator providing IMS, a Web-operator providing WebRTC services and the Web-operator and the IMS Operator having a business agreement with the user having a WebRTC Subscription, but not having an IMS description, will now be described with regard to FIG. 11, e.g., corresponding to the deployment described in FIG. 7.

Figure 11:
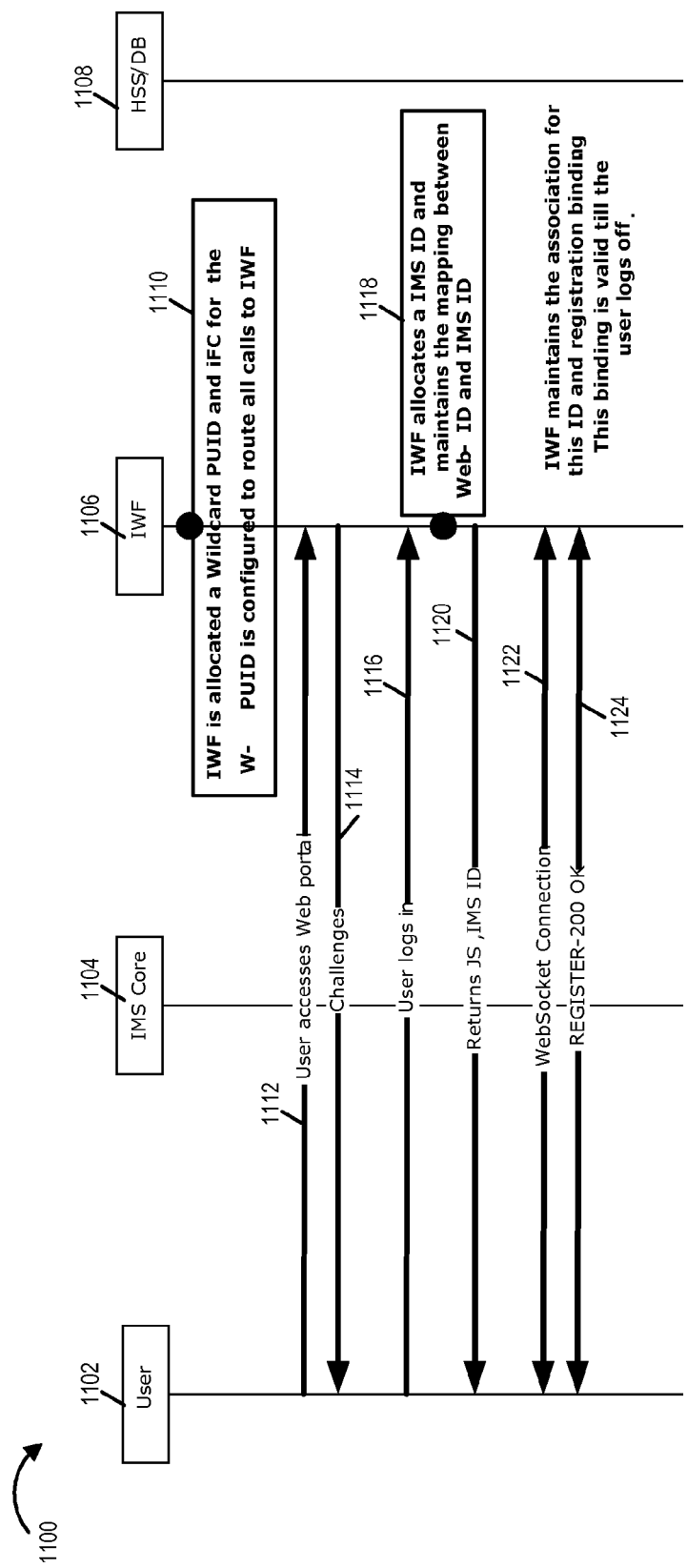
FIG. 11 illustrates an exemplary call flow corresponding to an IMS Operator providing IMS, a Web-operator providing WebRTC services and the Web-operator and the IMS Operator having a business agreement with the user having a WebRTC subscription, but not having an IMS subscription.

Drawing 1100 of FIG. 11 includes user 1102, IMS core 1104, Web RTC Signaling IWF 1106, and HSS/DB 1108. In this example different Operators provide IMS and WebRTC Services.

As a part of business agreement between Web and IMS operators, the web-operator is allocated a pool of IMS ID's (wild-card IMPU) which are statically provisioned/registered at the IMS operator. In step 1110 IWF 1106 is allocated a wildcard PUID (W-PUID), and the iFC for the W-PUID is configured to route all calls to IWF 1106.

In step 1112 user 1102 access the web portal. In step 1114 the IWF 1106 challenges 1114 the user 1102. In step 1116 the user logs into WebRTC connection and in step 1118 is allocated a temporary IMS ID from a pool of IMS ID's allocated to web operator, and the IWF 1106 maintains the mapping between the Web-ID and the IMS ID.

In step 1120 the IWF 1106 returns JavaScript (JS) and the allocated IMS ID to the user 1102. A web socket connection is established between the user 1102 and IWF 1106 via signaling 1122. User 1102 sends Register signal to IWF 1106, and the IWF 1106 responds with 200 OK signal, as indicated by signaling 1124.

The IWF 1106 maintains the association for this ID and registration binding. This binding is valid until the user 1102 logs off.

As described above, the WebRTC IWF 1106 acts as a SIP AS (in the IMS network). When the user logs in using the WebRTC connection in step 1116, the IWF 1106 is in the path (after all). As per the IMS network is concerned, the pool of ID's are configured to be statically registered and have an iFC pointing to IWF 1106. The IWF 1106 can access IMS services by configuring "registered" service invocation in the iFC and can also initiate calls etc. as a SIP AS on behalf of the user.

The IMS ID allocated to the user in step 1118 can be a permanent number (based on user having paid subscription fee) or a temporary number (that is allocated only for that web/login session with limited features being available).

Exemplary signaling regarding outgoing calls will now be described. The below description is applicable for various deployment models. The user uses either IMS or WebRTC connection for outgoing calls based on user policy. (In case the user doesn't have IMS subscription, only WebRTC connection is used).

The signaling IWF node may invoke other AS instances as needed for any services; after which, it either: (i) connects to WebRTC client directly if the final destination is WebRTC client or (ii) or interworks to IMS if the final destination is not WebRTC client. It would also invoke Media IWF to perform WebRTC-IMS media interworking.

Figure 12:
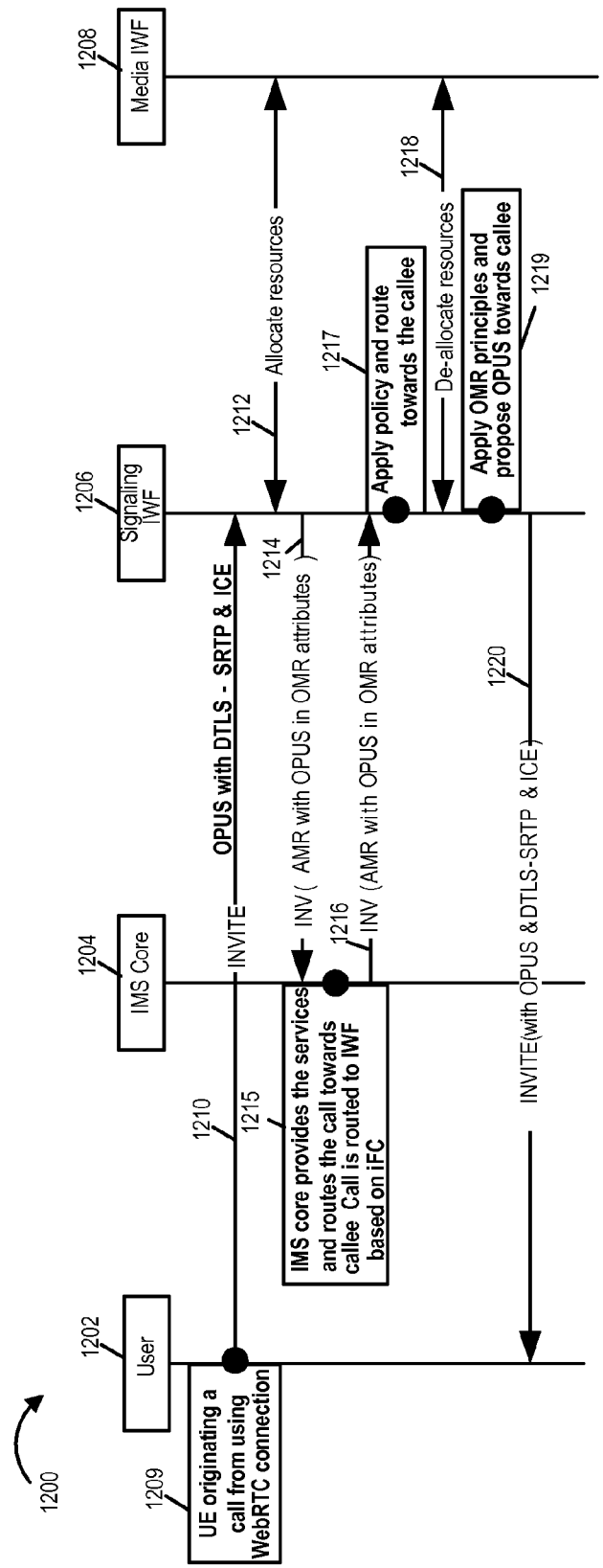
FIG. 12 illustrates an exemplary call-flow showing IMS service invocation.

An exemplary call-flow showing IMS service invocation is shown in drawing 1200 of FIG. 12.

The call-flow of drawing 1200 of FIG. 12 shows how signaling IWF 1206 invokes IMS services and temporarily allocates transcoding resources, as indicated by line 1212, (since the call may after all get routed towards a PSTN or regular IMS subscriber) and de-allocates transcoding resources, as indicated by line 1218, after the service invocation when the call finally gets routed to another WebRTC subscriber. The above call-flow of FIG. 12 makes use of OMR (Optimal Media Routing) procedures. The call-flow of FIG. 12 is valid even if V4-V6 interworking were to happen, and this case is handled by allocating a TURN server capable of V4-V6 interworking.

In step 1209, the UE 1202 originates a call using the WebRTC connection, sending INVITE (OPUS with DTLS-SRTP & ICE) signal 1210 to Signaling IWF 1206. The signaling IWF 1206 allocates resources to Media IWF 1208 as indicated by arrow 1212. The signaling IWF 1206 sends INVITE (AMR with OPUS in OMR attributes) signal 1214 to IMS core 1204. In step 1215, the IMS core 1204 provides the services and routes the call toward the callee. The call is routed to IWF based on iFC. The IMS core 1204 sends INVITE (AMR with OPUS in OMR attributes) signal 1216 to Signaling IWF 1206. In step 1217 the signaling IWF applies policy and routes toward the callee. The signaling IWF de-allocates resources as indicated by arrow 1218. In step 1219 the signaling IWF applies OMR principles and proposes OPUS toward the callee. Signaling IWF 1206 sends INVITE (with OPUS and DTLS-SRTP & ICE) signal 1220 to user 1202.

Figure 13:
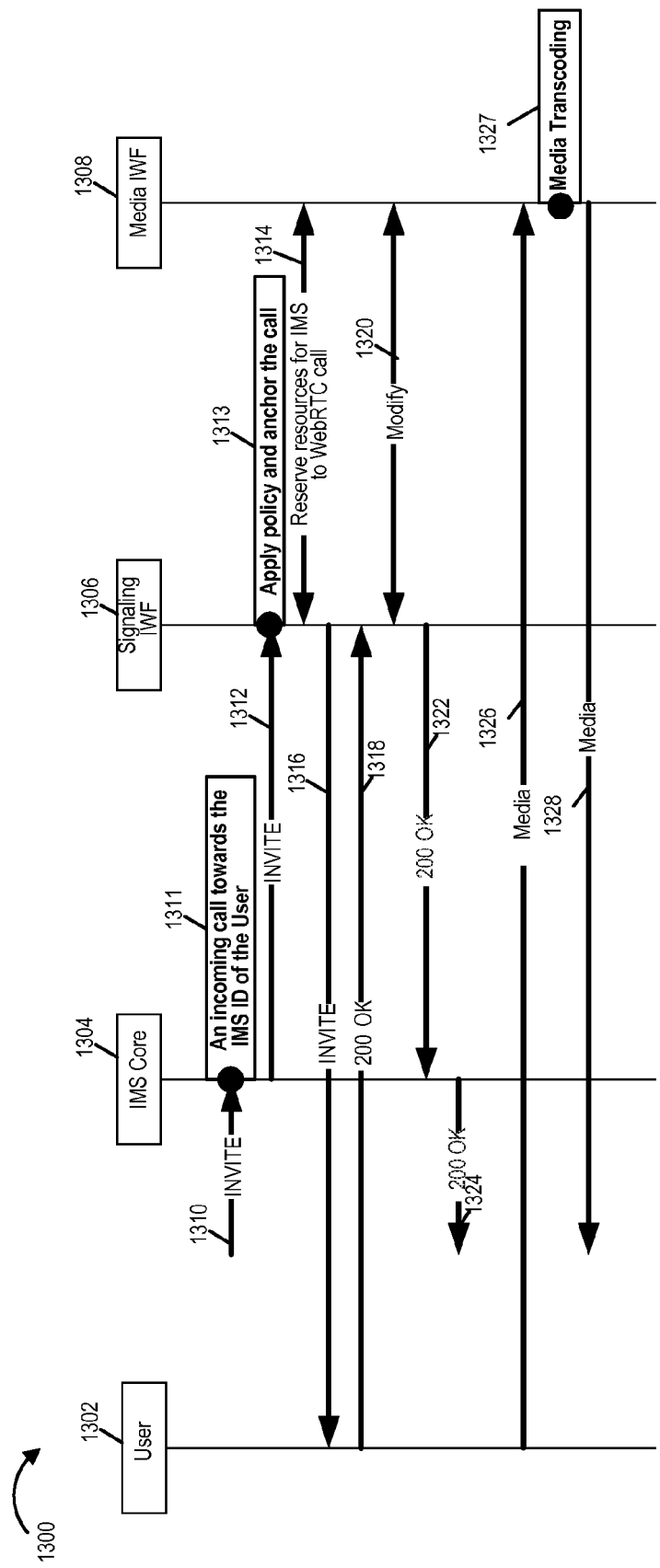
FIG. 13 illustrates exemplary call-flow depicting an incoming call from an IMS network.

Drawing 1300 of FIG. 13 illustrates exemplary call-flow depicting an incoming call from IMS network. This call-flow is applicable for all deployments.

In the example of FIG. 13, there is an incoming call-flow from IMS, and the same Operator provides IMS and WebRTC Services.

When a call/session is received via the IMS network, the IWF 1306 (as a SIP AS) is invoked as per IMS procedures, irrespective of whether the user is IMS registered or not. When a call/session is received via WebRTC network, the IWF 1306 is in the path (after all). The IWF 1306, anchors the call in either case and applies policy, when an incoming call is received for the UE.

In some embodiments, IWF 1306 takes one of the paths based on registration state (SIP/WebRTC), signaling information in SIP registration (like Visited-Network-ID, Access-network-Info etc) and other static user preferences (time-of-day) etc.

In some embodiments, IWF 1306 delivers presence or IM traffic over WebRTC connection while delivering voice/video sessions over regular IMS/LTE connection.

In some embodiments, IWF 1306 delivers the call over the same type of connection on which incoming session is received so that (media) transcoding is not needed.

In some embodiments, IWF 1306 delivers all calls over WebRTC connection if the user is currently accessing WebRTC services via WiFi/Broadband and thus saves cost. This would be useful when the user is at home using his/her broadband connection or is roaming accessing WebRTC using a WiFi connection at a hotel, café, etc.

In some embodiments, IWF 1306 forks the calls on both the connections if the user has used different devices for both the connections.

In the exemplary call-flow of FIG. 13, it is shown that the call is delivered over WebRTC connection. The Media IWF 1308 is invoked to perform transcoding in step 1327.

INVITE signal 1310 is received by the IMS core 1304. In step 1311, the IMS core 1304 routes the incoming call toward the IMS ID of User 1302. IMS core 1304 sends INVITE signal 1312 to Signaling IWF 1306. Signaling IWF 1306 applies policy and anchors the call in step 1313. In this example, in accordance with the applied policy, the call is to be delivered over WebRTC connection. Signaling IWF 1306 communicates signals 1314 with media IWF 1308 reserving resource for the IMS to WebRTC call. Signaling IWF 1306 sends INVITE 1316 to user 1302. User 1302 responds with 200 OK signal 1318.

Signaling IWF 1306 communicates modify signals 1320 with media IWF 1308. IWF sends 200 OK signal 1322 to IMS core 1304. IMS core 1304 sends 200 OK signal 1324 to the UE which initiated the incoming call.

Media signaling 1326 is sent from user 1302 to media IWF 1308, which performs media transcoding in step 1327. Media IWF 1308 sends media signaling 1328 to the UE which initiated the incoming call.

Figure 14:
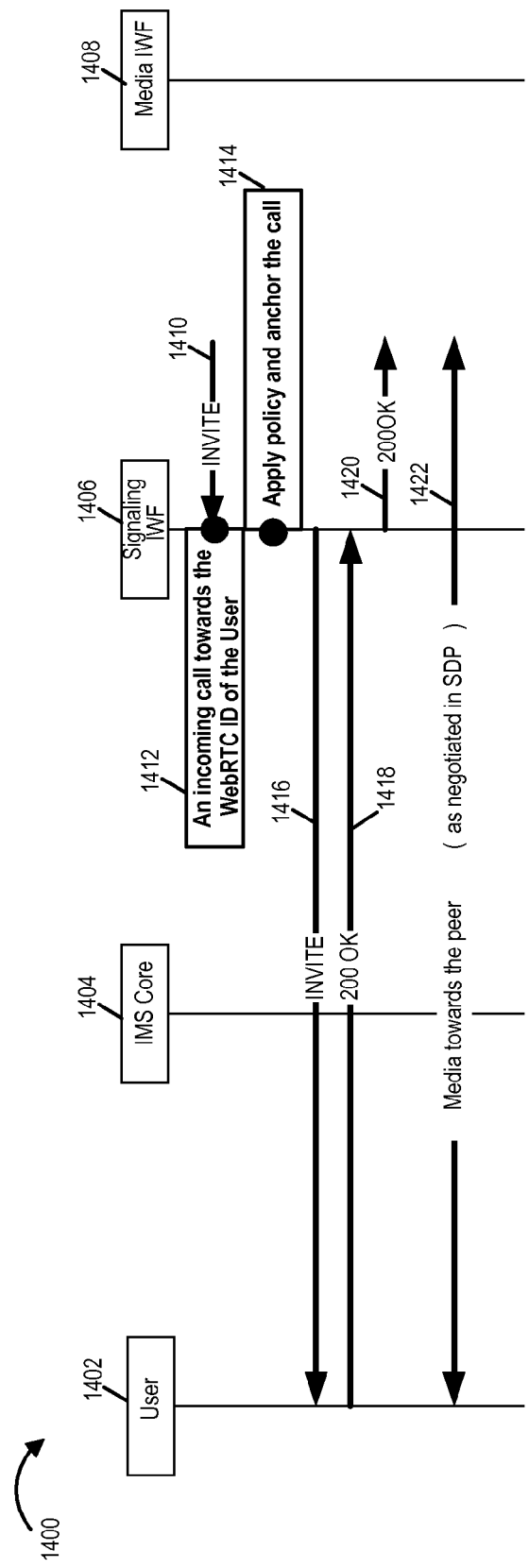
FIG. 14 illustrates and exemplary call-flow shows an incoming call from another WebRTC client in which the call is delivered over WebRTC, thus avoiding transcoding.

Drawing 1400 of FIG. 14 illustrates an exemplary call-flow showing an incoming call from another WebRTC client, and the call is delivered over WebRTC, thus avoiding transcoding.

INVITE signal 1410 is received by signaling IWF 1406. In step 1412, signaling IWF 1406 identifies that there is an incoming call toward the WebRTC ID of User 1402. Signaling IWF 1406 applies policy and anchors the call in step 1414. While SIP signaling such as the INVITE signal is used for purposes of explanation, other types of signaling may be used to provide the same or similar functionality instead of SIP signaling. In this example, the applied policy determines that the incoming call is to be delivered over WebRTC, thus avoiding transcoding. Signaling IWF 1406 sends INVITE 1416 to User 1402, which responds with 200 OK signal 1418. Signaling IWF 1406 sends 200 OK 1420 to the other WebRTC client which initiated the call. Media signaling 1422 is established toward as peer as negotiated in SDP. Thus media signaling is established between the user device which initiated the call and user 1402 over a signaling path which does not include media IWF 1408.

Exemplary handover between access networks will now be described. In one exemplary scenario the user moves from one access network, e.g., an LTE access network, to another access network, e.g., a WiFi access network. The WiFi access network may be owned by the same operator as of LTE access network or a different operator. Depending upon who owns the WiFi access network, the handover analysis would differ.

An example in which an IMS Operator provides IMS and WebRTC services will be described. In this deployment, the handover depends on how WebRTC connection has been established.

In one scenario IMS and WebRTC connections have been established via LTE access using same the client (mobile) and the same operator owns LTE and WiFi access-types. In this scenario, as the user moves from LTE to WiFi, the IP address is preserved (at PDN-GW), and the handover is seamless at the application layer.

Figure 15:
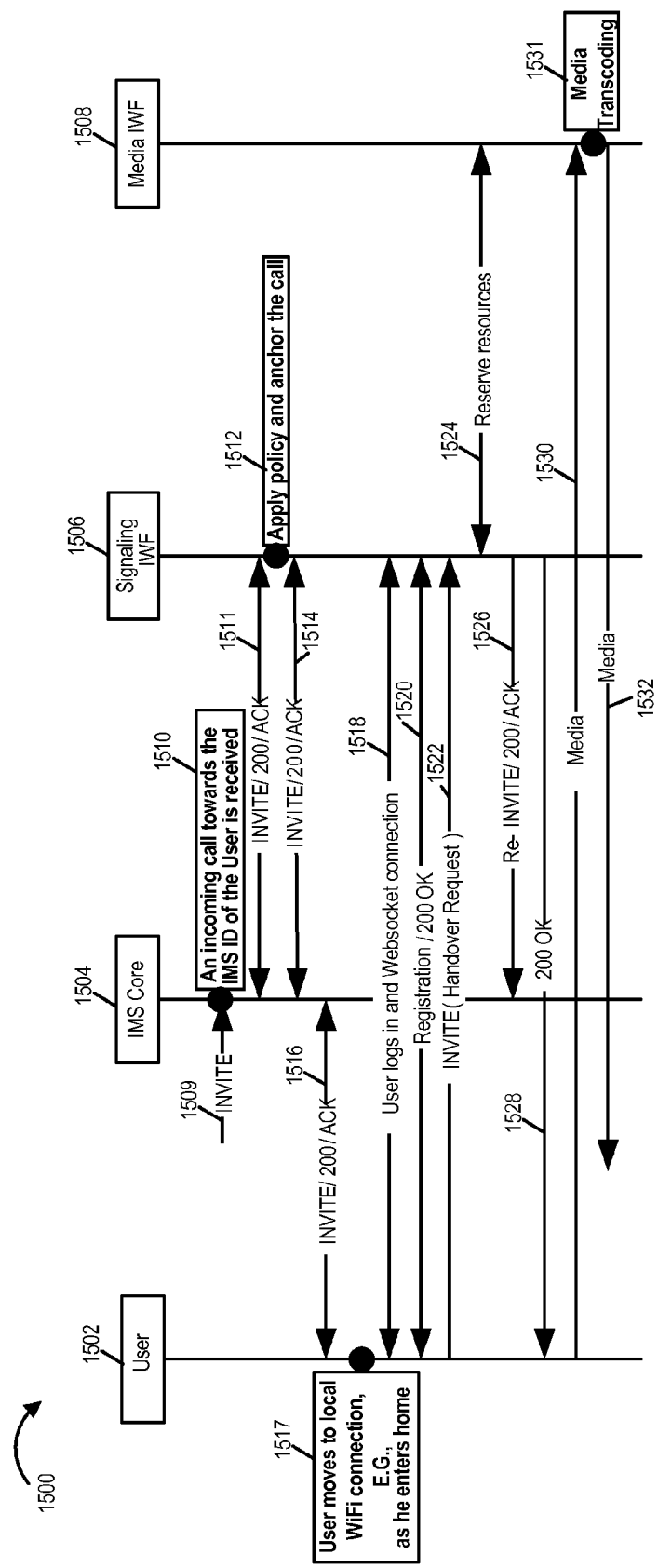
FIG. 15 illustrates an exemplary call-flow including a LTE to Wi-Fi handover.

In another scenario IMS and WebRTC connections have been established via LTE access using the same client (mobile) and different operators own LTE and WiFi access-types. Since the IWF anchors the call, the IWF handles the handover from LTE to WiFi. An exemplary call-flow including LTE to Wi-Fi handover is shown in drawing 1500 of FIG. 15.

The initial call is established between an IMS client (caller) and another IMS client (callee). As the callee moves between LTE to WiFi connection, the user establishes a new WebRTC connection and sends a handover request. The call is switched over to the new WebRTC leg. Since the new leg needs transcoding, the media IWF 1508 is invoked.

Invite signal 1509 from an IMS client (caller) is received by IMS core 1504. In step 1510, the IMS core 1504 sends the incoming call toward the IMS ID of the user 1502. INVITE/200/ACK signaling 1511 is exchanged between IMS core 1504 and Signaling IWF 1506. In step 1512, signaling IWF 1506 applies policy and anchors the call. INVITE/200/ACK signaling 1514 is exchanged between signaling IWF 1506 and IMS core 1504. INVITE/200/ACK signaling 1516 is exchanged between signaling IMS core 1504 and user 1502.

In step 1517, user 1502, which is the callee, moves to a local Wi-Fi connection, e.g., as he enters his home. User 1502 exchanges user log-in and Websocket establishment signaling 1518 with signaling IWF 1506. User 1502 exchanges Registration/200 OK signaling 1520 with signaling IWF 1506. User 1502 generates and sends an INVITE (Handover Request) signal 1522 to signaling IWF 1506. Signaling IWF 1506 communicates with media IWF 1508, exchanging signals 1524 to reserve resources. Signaling IWF 1506 communicates with IMS core 1504, exchanging signals 1526 including Re-INVITE/200/ACK. Signaling IWF 1506 sends a 200 OK signal 1528 to user 1502. Media signals 1530 are communicated from user 1502 to Media IWF 1508. Media IWF 1508 performs media transcoding in step 1531, and sends media signals 1532 to the caller. In at least some embodiments, the call-leg towards the callee over IMS (that is delivered using 1514 and 1516) is cleared, but this is not shown in the figure for brevity.

Figure 16:
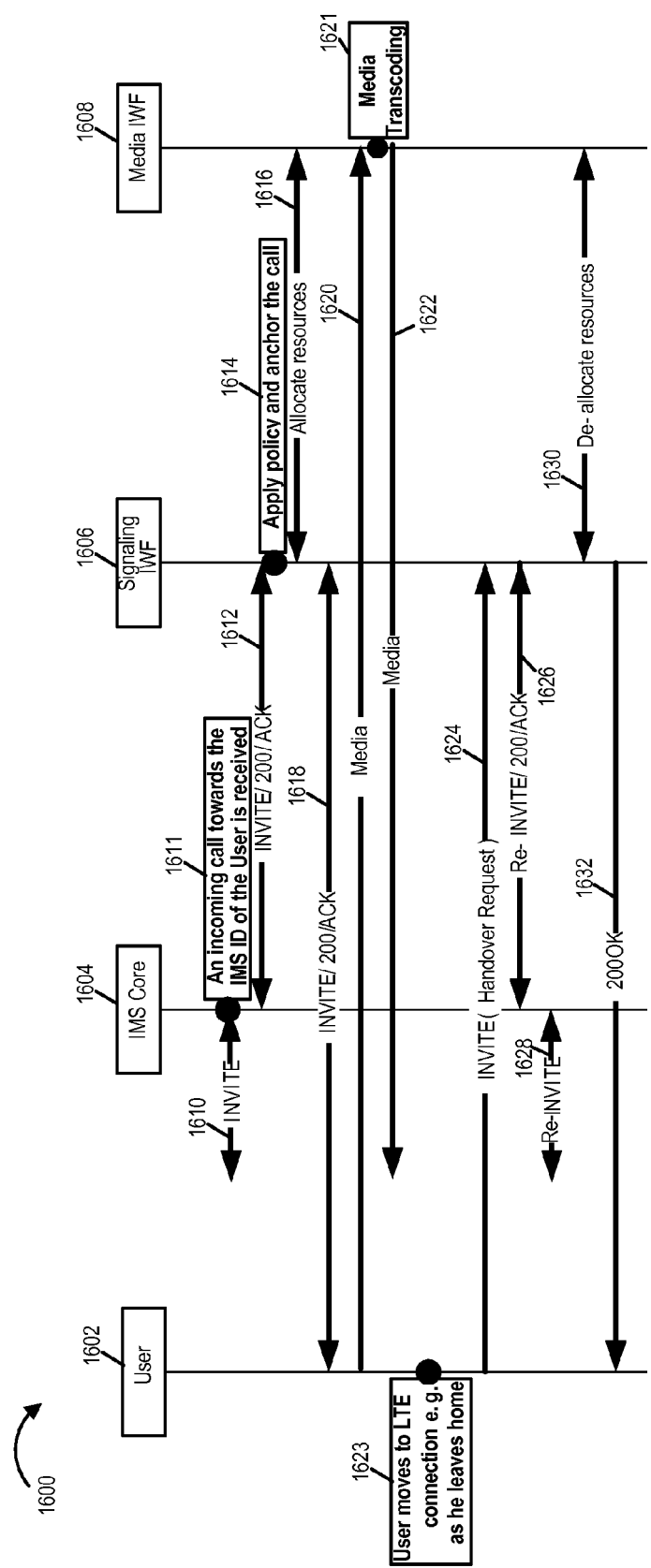
FIG. 16 illustrates an exemplary call-flow for a WiFi to LTE handover.

An exemplary call-flow for a WiFi to LTE handover is as shown in drawing 1600 of FIG. 16.

INVITE signal 1610 is received by IMS core 1604 in step 1611. The INVITE 1610 corresponds to an incoming call toward the IMS ID of user 1602. IMS core 1604 sends an INVITE to signaling IWF 1606, which responds with 200/ACK signals, as indicated by line 1612. In step 1614, the signaling IWF 1606 applies policy and anchors the call. Signaling IWF 1606 allocates resources to media IWF 1608, as indicated by line 1616. Signaling IWF 1606 also sends an INVITE signal to user 1602 which responds with 200/ACK signals, as indicated by line 1618. User 1602 sends media signals 1620 to media IWF 1608, which performs media transcoding in step 1621. The media IWF 1608 send media signals 1622 to the caller.

In step 1623, user 1623 moves from Wi-Fi to LTE, e.g., as the user leaves home. User 1602 sends INVITE (Handover Request) signal 1624 to signaling IWF 1606. Signaling IWF 1606 sends RE-INVITE signal to IMS core 1604, which responds with 200/ACK signal, as indicated by line 1626. The IMS core 1604 sends RE-INVITE signal to the caller, as indicated by line 1628. Signaling IWF 1606 sends signal 1630 to media IWF 1630 to de-allocate resources. Signaling IWF 1606 sends 200 OK signal 1632 to user 1602. In at least some embodiments, the call-leg towards the callee over WiFi (that is delivered using 1618) is cleared, but this is not shown in the figure for brevity.

In some embodiments, an IMS Operator provides IMS Services, a Web-operator provides WebRTC services, and the Web Operator and IMS Operator have a business agreement. In one such scenario, the user has IMS and WebRTC subscriptions. The same analysis as that of "IMS Operator providing IMS and WebRTC Services" is applicable for this scenario.

In some embodiments, an IMS Operator provides IMS Services, a Web-operator provides WebRTC services, and the Web Operator and IMS Operator have a business agreement. In one such scenario, the user has only a WebRTC subscription.

The user may use LTE access for establishing WebRTC connection and later switch to WiFi during an established session. The call-flow would be similar to what was discussed earlier.

The use of a load balancer (LB) in some embodiments of the present invention will now be discussed. When multiple AS-instances are to be deployed, in some embodiments, the same AS instance shall be selected for IMS registration and WebServices login so that the AS can take intelligent routing decisions. The association can be stored in HSS when the user initially registers it in (say) IMS and use this information when the user subsequently registers via WebRTC connection.

The WebRTC IMS AS architecture is also particularly suited to those deployments in which a Web operator provides native WebRTC services and invokes IMS services on an as needed basis for example for providing such services as conferencing. Such an architecture avoids the need to do WebRTC to IMS interworking for the native WebRTC services as well as avoiding any associated media interworking and performs the WebRTC to IMS interworking and any associated media interworking for those services which invoke IMS services such as for example conferencing. Currently, the 3GPP architecture does not support instances where WebRTC provides value-added services on its own. The WebRTC IMS AS architecture described herein does provide such value-added services.

The WebRTC IMS AS architecture described allows for direct media exchanges between two WebRTC browsers in an intuitive manner. Similar applications extend to incoming call routing logic and handover procedures where the same AS instance provides interworking as well as the other call processing logic, as opposed to using a separate AS in the core apart from the IWF AS.

Figure 17:
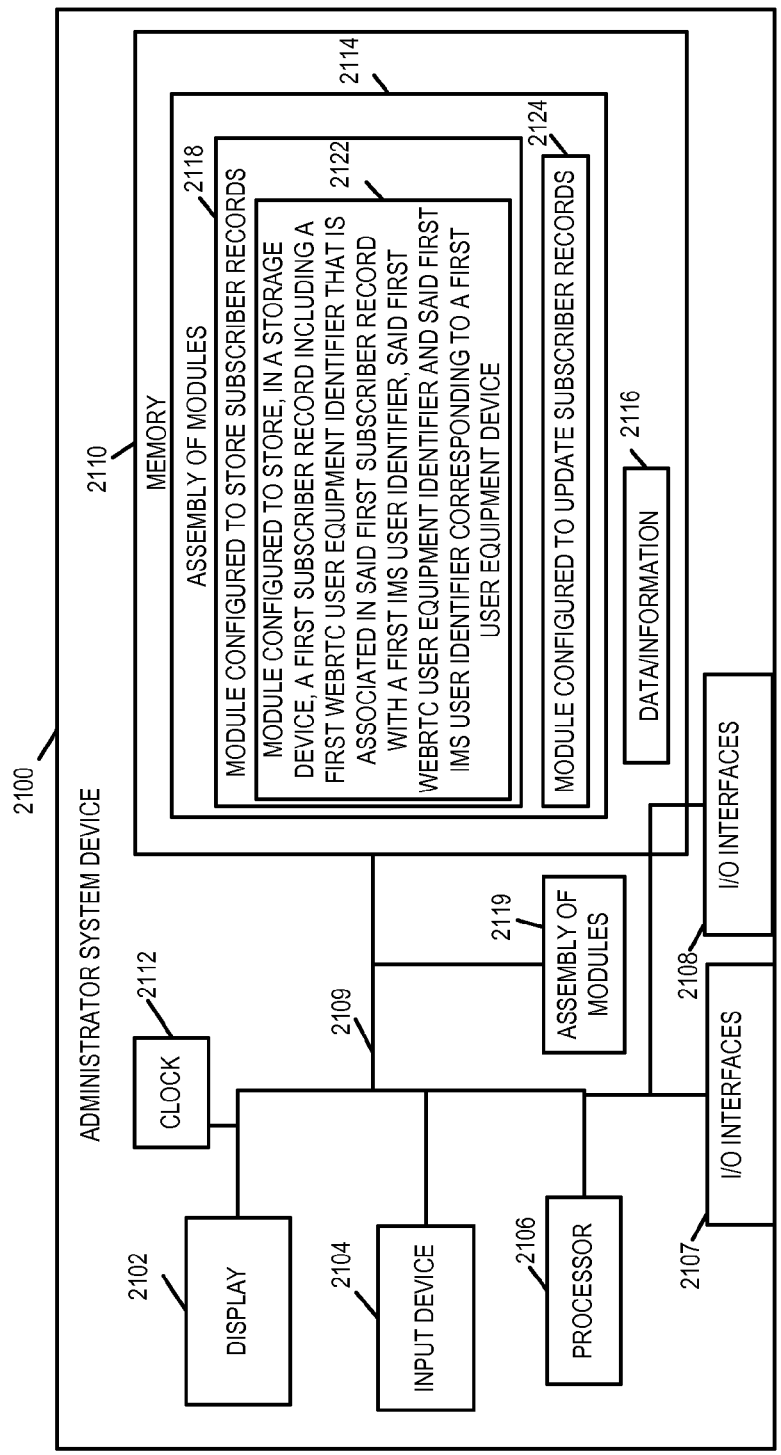
FIG. 17 is a drawing of an exemplary administrator system device implemented in accordance with an exemplary embodiment.

FIG. 17 is a drawing of an exemplary administrator system device 2100 implemented in accordance with an exemplary embodiment. Exemplary administrator system device 2100 is, e.g., administrator system device 307 of FIG. 3. Exemplary administrator system device 2100 includes a display 2102, an input device 2104, a processor 2106, e.g., a CPU, I/O interfaces 2107 and 2108, which couple device 2100 to various other devices including a storage device, memory 2110, a clock 2112, and an assembly of modules 2119, e.g., circuits corresponding to different modules, coupled together via a bus 2109 over which the various elements may interchange data and information. Memory 2110 includes an assembly of modules 2114, e.g., an assembly of software modules, and data/information 2116. Assembly of modules 2114 includes a module 2118 configured to store subscriber records and a module 2124 configured to update subscriber records. Module 2118 includes a module 2122 configured to store in a storage device, a first subscriber record including a first WebRTC user equipment identifier that is associated in said first subscriber record with a first IMS user identifier, said first WebRTC user equipment identifier and said first IMS user identifier corresponding to a first user equipment device. The first user equipment device is, e.g., a smart phone with IMS and WebRTC capability corresponding to a first user.

Modules in assembly of modules 2118 control operation of device 2100 to implement the functions corresponding to the modules when the modules are executed by a processor, e.g., processor 2106. While shown in the FIG. 17 embodiment as a single processor, e.g., computer, it should be appreciated that the processor 2106 may be implemented as one or more processors, e.g., computers.

When implemented in software the modules in assembly of modules 2118 include code, which when executed by the processor 2106, configure the processor 2106 to implement the function corresponding to the module. In some embodiments, the memory 2110 is a computer program product comprising a computer readable medium comprising code, e.g., individual code for each module, for causing at least one computer, e.g., processor 2106, to implement the functions to which the modules correspond.

In some embodiments, the modules in assembly of module 2118 may be implemented in hardware, e.g., implemented in hardware as circuits and included in assembly of modules 2119.

Completely hardware based or completely software based modules may be used. However, it should be appreciated that any combination of software and hardware, e.g., circuit implemented modules may be used to implement the functions.

Figure 18:
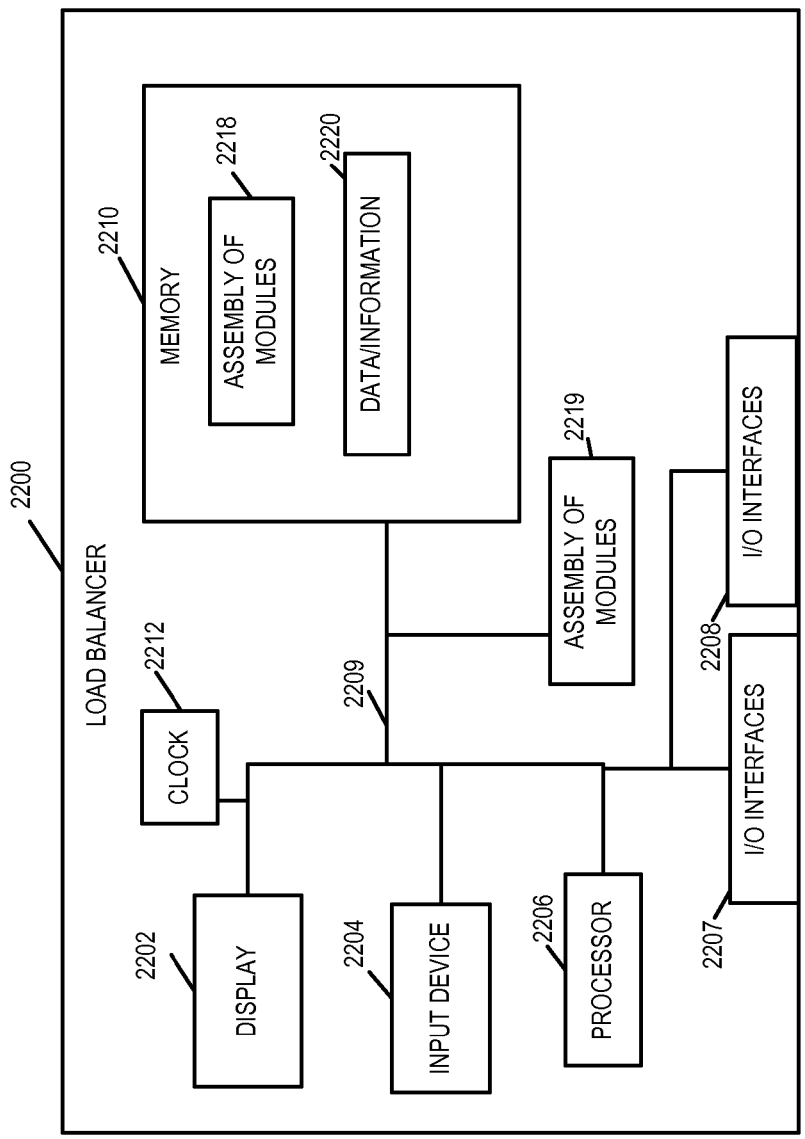
FIG. 18 is a drawing of an exemplary load balancer implemented in accordance with an exemplary embodiment.

FIG. 18 is a drawing of an exemplary load balancer 2200 implemented in accordance with an exemplary embodiment. Load balancer 2200 is, e.g., load balancer 308 of system 300 of FIG. 3 and/or a load balancer implementing steps of the method of FIG. 4. Exemplary load balancer 2200 includes a display 2202, an input device 2204, a processor 2206, e.g., a CPU, I/O interfaces 2207, 2208, which couple the load balancer to various devices including a plurality of application servers, memory 2210, a clock 2212, and an assembly of modules 2219, e.g., circuits corresponding to different modules, coupled together via a bus 2209 over which the various elements may interchange data and information. Memory 2210 includes an assembly of assembly of modules 2218, e.g., an assembly of software modules, and data/information 2220.

Figure 19:
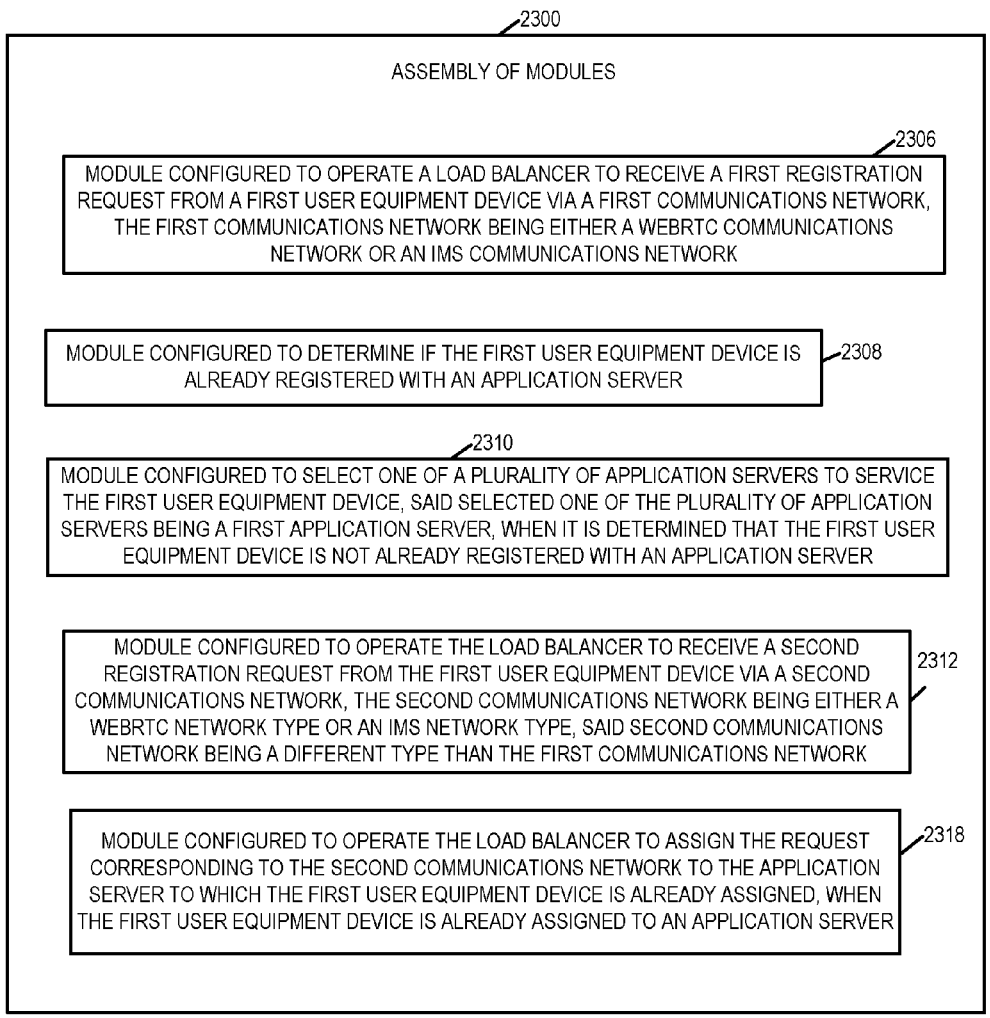
FIG. 19 illustrates an assembly of modules which can, and in some embodiments is, used in the load balancer illustrated in FIG. 18.

FIG. 19 illustrates an assembly of modules 2300 which can, and in some embodiments is, used in the load balancer 2200 illustrated in FIG. 18. The modules in the assembly of modules 2300 can, and in some embodiments are, implemented fully in hardware within the processor 2206, e.g., as individual circuits. The modules in the assembly of modules 2300 can, and in some embodiments are, implemented fully in hardware within the assembly of modules 2219, e.g., as individual circuits corresponding to the different modules. In other embodiments some of the modules are implemented, e.g., as circuits, within the processor 2206 with other modules being implemented, e.g., as circuits within assembly of modules 2219, external to and coupled to the processor. As should be appreciated the level of integration of modules on the processor and/or with some modules being external to the processor may be one of design choice.

Alternatively, rather than being implemented as circuits, all or some of the modules including in assembly of modules 2300 may be implemented in software and stored in the memory 2210 of the load balancer 2200, with the modules controlling operation of load balancer 2200 to implement the functions corresponding to the modules when the modules are executed by a processor, e.g., processor 2206. In some such embodiments, the assembly of modules 2300 is included in the memory 2210 as assembly of modules 2218. In still other embodiments, various modules in assembly of modules 2300 are implemented as a combination of hardware and software, e.g., with another circuit external to the processor providing input to the processor 2206 which then under software control operates to perform a portion of a module's function. While shown in the FIG. 18 embodiment as a single processor, e.g., computer, it should be appreciated that the processor 2206 may be implemented as one or more processors, e.g., computers.

When implemented in software the modules include code, which when executed by the processor 2206, configure the processor 2206 to implement the function corresponding to the module. In embodiments where the assembly of modules 2300 is stored in the memory 2210, the memory 2210 is a computer program product comprising a computer readable medium comprising code, e.g., individual code for each module, for causing at least one computer, e.g., processor 2206, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 19 control and/or configure the load balancer 2200 or elements therein such as the processor 2206, to perform functions of corresponding steps illustrated in the method flowchart 400 of FIG. 4. Thus the assembly of modules 2300 includes various modules that perform functions of the corresponding steps of the method shown in FIG. 4.

Assembly of module 2300 includes a module 2306 configured to operate a load balancer to receive a first registration request from a first user equipment device via a first communications network, the first communications network being either a WebRTC communications network or an IMS communications network, a module 2308 configured to determine if the first user equipment device is already registered with an application server, and a module 2310 configured to select one of a plurality of application servers to service the first user equipment device when it is determined that the first user equipment device is not already registered with an application server, said selected one of the plurality of application servers being a first application server. Assembly of modules 2300 further includes a module 2312 configured to operate the load balancer to receive a second registration request from the first user equipment device via a second communications network, the second communications network being either a WebRTC communications network or an IMS network type, said second communications network being a different type than the first communications network, and a module 2318 configured to operate the load balancer to assign the request corresponding to the second communications network to the application server to which the first user equipment device is already assigned, when the first user equipment device is already assigned to an application server.

Figure 20:
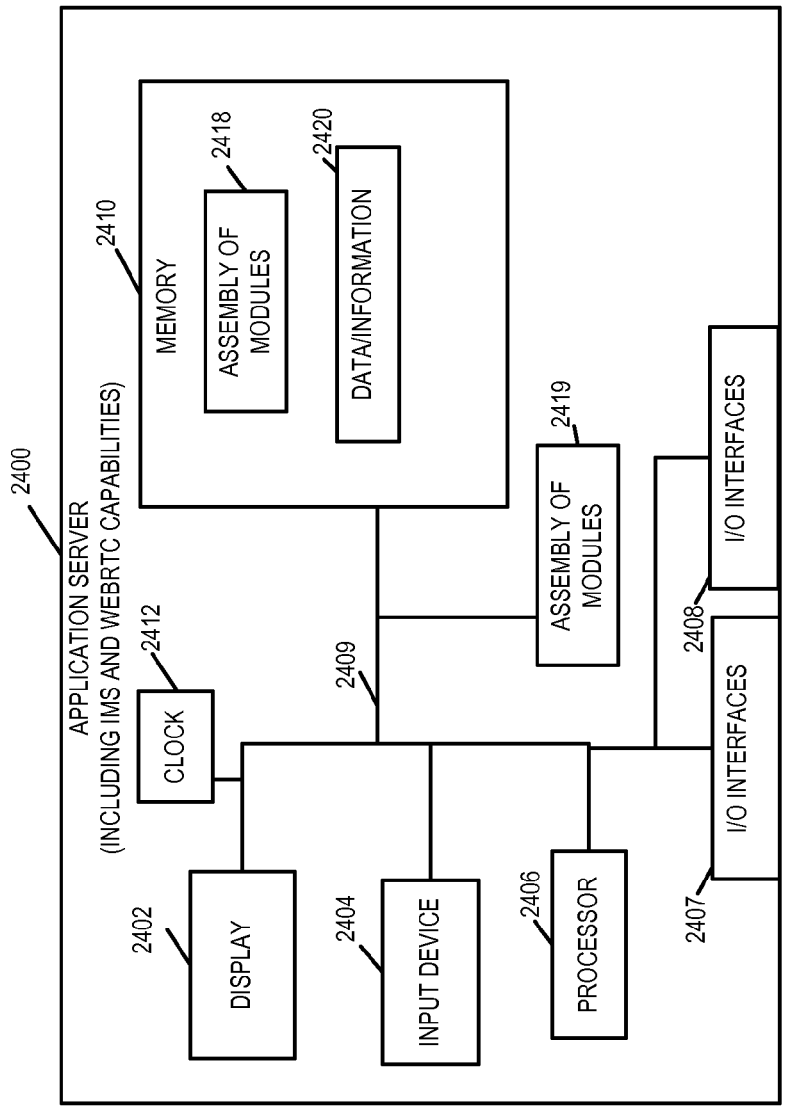
FIG. 20 is a drawing of an exemplary application server implemented in accordance with an exemplary embodiment.

FIG. 20 is a drawing of an exemplary application server 2400 implemented in accordance with an exemplary embodiment. Exemplary application server 2400 is, e.g., one of application server 106 of FIG. 1, application server 214 of FIG. 2, one of the application servers (AS 1 302, AS 2 304, . . . , AS N 306) of FIG. 3, an application server implementing steps of the method of FIG. 4, WebRTC Signaling IWF 606 of FIG. 6, WebRTC Signaling IWF 706 of FIG. 7, WebRTC Signaling IWF 806 of FIG. 8, WebRTC Signaling IWF 906 of FIG. 9, IWF 1006 of FIG. 10, IWF 1106 of FIG. 11, Signaling IWF 1206 of FIG. 12, Signaling IWF 1306 of FIG. 13, Signaling IWF 1406 of FIG. 14, Signaling IWF 1506 of FIG. 15, or Signaling IWF 1606 of FIG. 16.

Exemplary application server 2400 includes a display 2402, an input device 2404, a processor 2406, e.g., a CPU, I/O interfaces 2407, 2408 which couples the application server 2400 to other devices including a load balancer, memory 2410, a clock 2412, and an assembly of modules 2419, e.g., circuits corresponding to different modules, coupled together via a bus 2409 over which the various elements may interchange data and information. Memory 2410 includes an assembly of assembly of modules 2418, e.g., an assembly of software modules, and data/information 2420.

Figure 21:
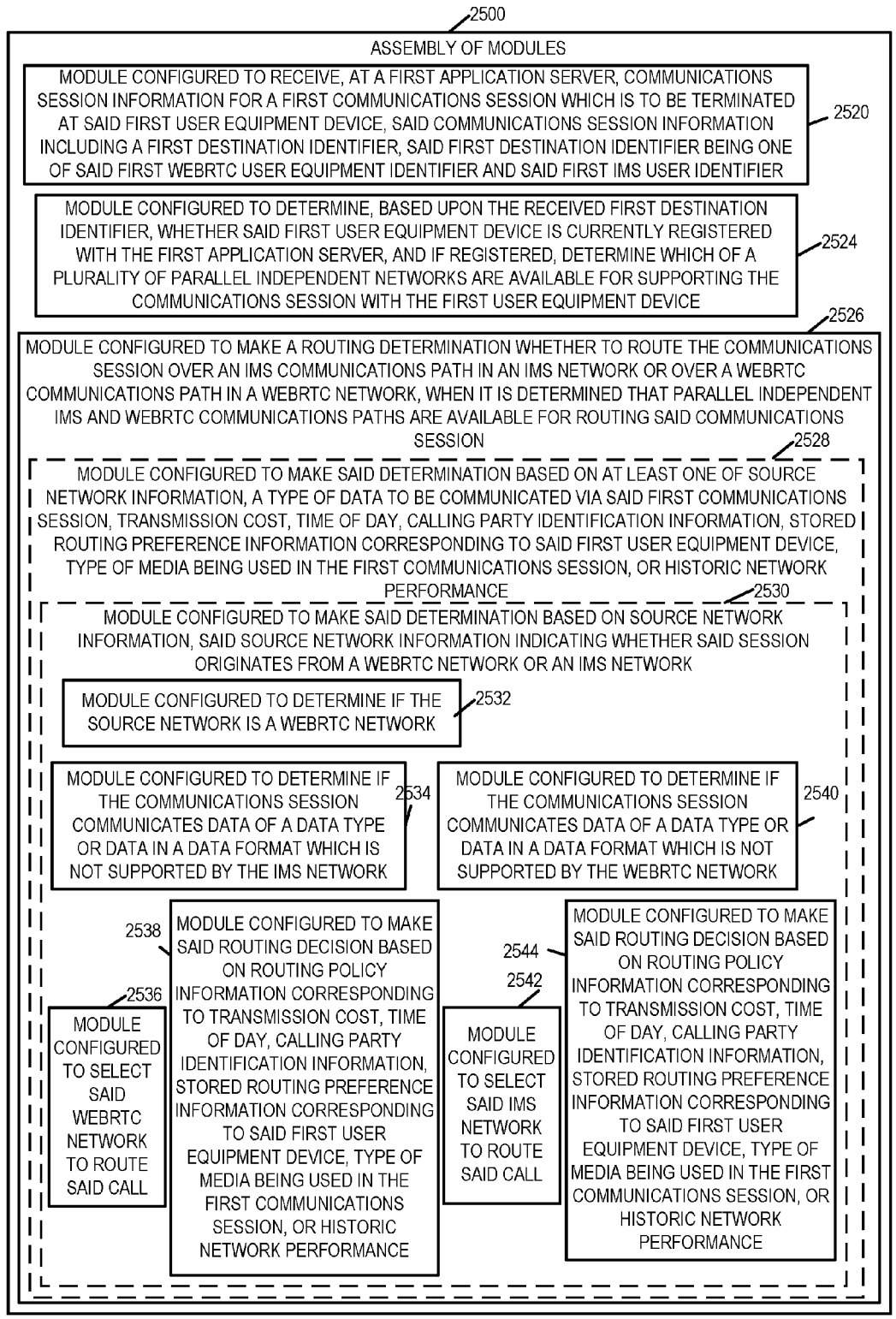
FIG. 21 illustrates an assembly of modules which can, and in some embodiments is, used in the applications server illustrated in FIG. 20.

FIG. 21 illustrates an assembly of modules 2500 which can, and in some embodiments is, used in the applications server 2400 illustrated in FIG. 20. The modules in the assembly of modules 2500 can, and in some embodiments are, implemented fully in hardware within the processor 2406, e.g., as individual circuits. The modules in the assembly of modules 2500 can, and in some embodiments are, implemented fully in hardware within the assembly of modules 2419, e.g., as individual circuits corresponding to the different modules. In other embodiments some of the modules are implemented, e.g., as circuits, within the processor 2406 with other modules being implemented, e.g., as circuits within assembly of modules 2419, external to and coupled to the processor. As should be appreciated the level of integration of modules on the processor and/or with some modules being external to the processor may be one of design choice.

Alternatively, rather than being implemented as circuits, all or some of the modules in assembly of modules 2500 may be implemented in software and stored in the memory 2410 of the application server 2400, with the modules controlling operation of application server 2400 to implement the functions corresponding to the modules when the modules are executed by a processor, e.g., processor 2406. In some such embodiments, the assembly of modules 2500 is included in the memory 2410 as assembly of modules 2418. In still other embodiments, various modules in assembly of modules 2500 are implemented as a combination of hardware and software, e.g., with another circuit external to the processor providing input to the processor 2406 which then under software control operates to perform a portion of a module's function. While shown in the FIG. 24 embodiment as a single processor, e.g., computer, it should be appreciated that the processor 2406 may be implemented as one or more processors, e.g., computers.

When implemented in software the modules include code, which when executed by the processor 2406, configure the processor 2406 to implement the function corresponding to the module. In embodiments where the assembly of modules 2500 is stored in the memory 2410, the memory 2410 is a computer program product comprising a computer readable medium comprising code, e.g., individual code for each module, for causing at least one computer, e.g., processor 2406, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 21 control and/or configure the application server 2400 or elements therein such as the processor 2406, to perform functions of the corresponding steps illustrated in the method flowchart 400 of FIG. 4. Thus the assembly of modules 2500 includes various modules that perform functions of the corresponding steps of the method shown in FIG. 4.

FIG. 21 is a drawing of an assembly of modules 2500 which may be included in an exemplary first application server in accordance with an exemplary embodiment. Assembly of modules 2500 includes a module 2520 configured to receive, at a first application server, communications session information for a first communications session which is to be terminated at first user equipment device, said communications session information including a first destination identifier, said first destination identifier being one of said first WebRTC user equipment identifier and said first IMS user identifier, a module 2524 configured to determine, based upon the received first destination identifier, whether said first user equipment device is currently registered with the first application server, and if registered, determine which of a plurality of parallel independent networks are available for supporting the communications session with the first user equipment device. Assembly of modules 2500 further includes a module 2526 configured to make a routing determination whether to route the communications session over an IMS communications path in an IMS network, e.g., LTE, or over a WebRTC communications path in a WebRTC network, when it is determined that parallel independent IMS and WebRTC communications paths are available for routing said communications session. In some embodiments, module 2526 includes a module 2528 configured to make said determination based on at least one of source network information, a type of data to be communicated via said first communications session, transmission cost, time of day, calling party identification information, stored routing preference information corresponding to said first user equipment device, type of media being used in the first communications session or historic network performance. In some embodiments, the historic network performance is based on session statistics corresponding to one or more sessions.

In some embodiments, module 2528 is configured to make said determination based on the type of media being used in the first communications session, said type of media being used in the first communications session being communicated in the communication session setup. The type of media could be, e.g., voice/video or IM/presence. In some embodiments, when the type of media is voice or video, said module 2528 selects the IMS network to route said call based on policy; and when the type of media is IM/Presence, module 2528 selects the WebRTC network to route said call based on policy.

In some embodiments, module 2528 includes a module 2530 configured to make said determination based on source network information, said source network information indicating whether said session originates from a WebRTC network or an IMS network. Module 2530 includes a module 2532 configured to determine if the source network is a WebRTC network or an IMS network, a module 2534 configured to determine if the communications session communicates data of a data type or data in a data format which is not supported by the IMS network, a module 2536 configured to select said WebRTC network to route said call when module 2532 determines that the source network is a WebRTC network and module 2534 determines that the communications session communicates data of a data type or data in a data format which is not supported by the IMS network, and a module 2538 configured to make said routing decision based on routing policy information corresponding to transmission cost, time of day, calling party identification information, stored routing preference information corresponding to said first user equipment device, type of media being used in the first communications session or historic network performance when module 2532 determines that the source network is a WebRTC network and module 2534 determines that the communications session communicates data of a data type or data in a data format which is supported by the IMS network. In some embodiments, a gaming application communicates data of a data type or data in a data format which is not supported by the IMS network. Module 2530 further includes a module 2540 configured to determine if the communications session communicates data of a data type or data in a data format which is not supported by the WebRTC network, a module 2542 configured to select said IMS network to route said call when module 2532 determines that the source network is a IMS network and module 2540 determines that the communications session communicates data of a data type or data in a data format which is not supported by the WebRTC network, and a module 2544 configured to make said routing decision based on routing policy information corresponding to transmission cost, time of day, calling party identification information, stored routing preference information corresponding to said first user equipment device, type of media being used in the first communications session or historic network performance, when module 2532 determines that the source network is a IMS network and module 2540 determines that the communications session communicates data of a data type or data in a data format which is supported by the WebRTC network.

In some embodiments, module 2538 is configured to make said determination based on the type of media being used in the first communications session, said type of media being used in the first communications session being communicated in the communication session setup. The type of media could be, e.g., voice/video or IM/presence. In some embodiments, when the type of media is voice or video, said module 2538 selects the IMS network to route said call based on policy; and when the type of media is IM/Presence, module 2538 selects the WebRTC network to route said call based on policy.

In some embodiments, module 2544 is configured to make said determination based on the type of media being used in the first communications session, said type of media being used in the first communications session being communicated in the communication session setup. The type of media could be, e.g., voice/video or IM/presence. In some embodiments, when the type of media is voice or video, said module 2544 selects the IMS network to route said call based on policy; and when the type of media is IM/Presence, module 2544 selects the WebRTC network to route said call based on policy.

The techniques of various embodiments may be implemented using software, hardware and/or a combination of software and hardware. Various embodiments are directed to apparatus, e.g., communications device such as applications servers, load balancers, user equipment devices, etc. Various embodiments are also directed to methods, e.g., a communications routing method, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal generation, signal transmission, signal reception, signal processing, storing subscriber record information, retrieving subscriber record information, making a routing determination, making a policy decision, establishing a connection, establishing a communications session, implementing a routing decision, identifying a source network, identifying available alternative networks, retrieving routing policy information, using routing policy information, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as an application server, a load balancer, etc., including a processor configured to implement one, multiple or all of the steps of one or more methods of the invention.

In some embodiments, the processor or processors, e.g., CPUs, of one or more devices, e.g., of the communications device, e.g., application server or load balancer, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a application server or load balancer, with a processor which includes a module corresponding to each of the steps of the various described methods performed by the device in which the processor is included. In some but not all embodiments an apparatus, e.g., a communications device, e.g., a application server or load balancer, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a communications routing method. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications routing method comprising:
    storing in a storage device, a first subscriber record, said first subscriber record including a first Web Real-Time Communication (WebRTC) user equipment identifier that is associated in said first subscriber record with a first Internet Protocol Multimedia Subsystem (IMS) user identifier, said first WebRTC user equipment identifier and said first IMS user identifier corresponding to a first user equipment device;
    receiving at a first application server communications session information for a first communications session which is to be terminated at said first user equipment device, said communications session information including a first destination identifier, said first destination identifier being one of said first WebRTC user equipment identifier and said first IMS user identifier;
    determining, based upon the received first destination identifier, whether said first user equipment device is currently registered with the application server and if registered, determining which of a plurality of parallel independent networks are available for supporting the communications session with the first user equipment device;
    making a routing determination whether to route the communications session over an IMS communications path in an IMS network or over a WebRTC communications path in a WebRTC network, when it is determined that parallel independent IMS and WebRTC communications networks are available for routing said communications session; and
    selecting, based on the determination, the IMS communications path or the WebRTC communications path to route the communications session.

2. The method of claim 1, wherein the making a routing determination includes making said determination based on at least one of source network information, a type of data to be communicated via said first communications session, transmission cost, time of day, calling party identification information, stored routing preference information corresponding to said first user equipment device, type of media being used in the first communications session or historic network performance.

3. The method of claim 2, wherein making a routing determination includes making said determination based on source network information, said source network information indicating whether said session originates from a second WebRTC network or a second IMS network.

4. The method of claim 3, further comprising:
    when said source network is the second WebRTC network, determining if said communications session communicates data of a data type or data in a data format which is not supported by said IMS network;
    when it is determined that said communications session communicates data of a data type or data in a data format which is not supported by the IMS network, selecting said WebRTC network to route said call; and
    when it is determined that said communications session does not communicate data of a data type or data in a data format which is not supported by said IMS network, making said routing decision based on routing policy information corresponding to transmission cost, time of day, calling party identification information, stored routing preference information corresponding to said first user equipment device, type of media being used in the first communications session or historic network performance.

5. The method of claim 2 wherein the making a routing determination includes making said determination based on said type of media being used in the first communications session, said type of media being used in the first communications session being communicated in the communication session setup.

6. The method of claim 5, further comprising: when the type of media is voice or video, selecting the IMS network to route said call based on policy; and when the type of media is IM/Presence, selecting the WebRTC network to route said call based on policy.

7. The method of claim 1, further comprising, prior to performing said step of receiving at a first application server communications session information for a first communications session which is to be terminated at said first user equipment device, performing the steps of:
    operating a load balancer to receive a first registration request from the first user equipment device via a first communications network, the first communications network being either the WebRTC communications network or the IMS communications network;
    determining if the first user equipment device is already registered with an application server; and
    if the first user device is not already registered with an application server selecting one of a plurality of application servers to service the user device, said selected one of the plurality of application servers being said first application server.

8. The method of claim 7, further comprising:
    operating the load balancer to receive a second registration request from the first user equipment device via a second communications network, said second communications network being either a WebRTC network type or an IMS network type, said second communication network being of a different network type than said first communication network;
    determining if the first user equipment device is already registered with an application server; and if the first user device is already registered, operating the load balancer to assign the request corresponding to the second communications network to the application server to which the first user equipment device is already assigned.

9. A communications system comprising:
a storage device including a first subscriber record, said first subscriber record including a first Web Real-Time Communication (WebRTC) user equipment identifier that is associated in said first subscriber record with a first Internet Protocol Multimedia Subsystem (IMS) user identifier, said first WebRTC user equipment identifier and said first IMS user identifier corresponding to a first user equipment device;
a first application server, said first application server comprising:
logic configured to receive at said first application server communications session information for a first communications session which is to be terminated at said first user equipment device, said communications session information including a first destination identifier, said first destination identifier being one of said first WebRTC user equipment identifier and said first IMS user identifier;
logic configured to determine, based upon the received first destination identifier, whether said first user equipment device is currently registered with the application server and if registered, determining which of a plurality of parallel independent networks are available for supporting the communications session with the first user equipment device; and
logic configured to make a routing determination whether to route the communications session over an IMS communications path in an IMS network or over a WebRTC communications path in a WebRTC network, when it is determined that parallel independent IMS and WebRTC communications networks are available for routing said communications session; and
logic configured to select, based on the determination, the IMS communications path or the WebRTC communications path to route the communications session.

10. The communications system of claim 9, wherein said Internet Protocol Multimedia Subsystem (IMS) configured to make a routing determination includes logic configured to make said determination based on at least one of source network information, a type of data to be communicated via said first communications session, transmission cost, time of day, calling party identification information, stored routing preference information corresponding to said first user equipment device, type of media being used in the first communications session or historic network performance.

11. The communications system of claim 10, wherein said logic configured to make a routing determination includes logic configured to make said determination based on source network information, said source network information indicating whether said session originates from a second WebRTC network or a second IMS network.

12. The communication system of claim 11, wherein said first application server further includes:
logic configured to determine if said communications session communicates data of a data type or data in a data format which is not supported by said IMS network when said source network is the second WebRTC network;
logic configured to select said WebRTC network to route said call when it is determined that said communications session communicates data of a data type or data in a data format which is not supported by the IMS network; and
logic configured to make said routing decision based on routing policy information corresponding to transmission cost, time of day, calling party identification information, stored routing preference information corresponding to said first user equipment device, type of media being used in the first communications session or historic network performance when it is determined that said communications session does not communicate data of a data type or data in a data format which is not supported by said IMS network.

13. The communications system of claim 10, wherein said logic configured to make said determination based on at least one of source network information, a type of data to be communicated via said first communications session, transmission cost, time of day, calling party identification information, stored routing preference information corresponding to said first user equipment device, type of media being used in the first communications session or historic network performance is configured to make said determination based on the type of media being used in the first communications session, said type of media being used in the first communications session being communicated in the communication session setup.

14. The communications device of claim 13, when the type of media is voice or video, said logic configured to make said determination selects the IMS network to route said call based on policy; and when the type of media is IM/Presence, said logic configured to make said determination selects the WebRTC network to route said call based on policy.

15. The communications system of claim 9, further comprising:
a load balancer, said load balancer including:
logic configured to operate the load balancer to receive a first registration request from the first user equipment device via a first communications network, the first communications network being either the WebRTC communications network or the IMS communications network;
logic configured to determine if the first user equipment device is already registered with an application server; and
logic configured to select one of a plurality of application servers to service the user device if the first user device is not already registered with an application server, said selected one of the plurality of application servers being said first application server.

16. The communications system of claim 15, wherein said load balancer further comprises:
logic configured to operate the load balancer to receive a second registration request from the first user equipment device via a second communications network, said second communications network being either a Web RTC network type or an IMS network type, said second communication network being of a different network type than said first communication network;
and a module configured to operate the load balancer to assign the request corresponding to the second communications network to the application server to which the first user equipment device is already assigned if the first user device is already registered.

17. A system comprising:
a first non-transitory computer readable storage medium, the first non-transitory computer readable storage medium including instructions which when executed cause a first data processing apparatus to:
store in a storage device, a first subscriber record, said first subscriber record including a first Web Real-Time Communication (WebRTC) user equipment identifier that is associated in said first subscriber record with a first Internet Protocol Multimedia Subsystem (IMS) user identifier, said first WebRTC user equipment identifier and said first IMS user identifier corresponding to a first user equipment device;
a second non-transitory computer readable storage medium, the second non-transitory computer readable storage medium including instructions which when executed cause a second data processing apparatus to:
receive at a first application server communications session information for a first communications session which is to be terminated at said first user equipment device, said communications session information including a first destination identifier, said first destination identifier being one of said first WebRTC user equipment identifier and said first IMS user identifier;
determine, based upon the received first destination identifier, whether said first user equipment device is currently registered with the application server and if registered, determining which of a plurality of parallel independent networks are available for supporting the communications session with the first user equipment device;
make a routing determination whether to route the communications session over an IMS communications path in an IMS network or over a WebRTC communications path in a WebRTC network, when it is determined that parallel independent IMS and WebRTC communications networks are available for routing said communications session; and
selecting, based on the determination, the IMS communications path or the WebRTC communications path to route the communications session.

18. The system of claim 17, further comprising:
a third non-transitory computer readable storage medium, the third non-transitory computer readable storage medium including instructions which when executed cause a third data processing apparatus to:
operate a load balancer to perform the steps of:
receiving a first registration request from the first user equipment device via a first communications network, the first communications network being either the WebRTC communications network or the IMS communications network;
determining if the first user equipment device is already registered with an application server; and
if the first user device is not already registered with an application server selecting one of a plurality of application servers to service the user device, said selected one of the plurality of application servers being said first application server,
said steps being performed by the third processing apparatus being performed prior to performing said step of receiving at a first application server communications session information for a first communications session which is to be terminated at said first user equipment device.

\* \* \* \* \*